(12) United States Patent
Lee et al.

(10) Patent No.: US 10,594,927 B2
(45) Date of Patent: Mar. 17, 2020

(54) MOBILE TERMINAL AND OPERATING METHOD THEREOF

(71) Applicant: LG ELECTRONICS INC., Seoul (KR)

(72) Inventors: Jisun Lee, Seoul (KR); Suyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 15/456,345

(22) Filed: Mar. 10, 2017

(65) Prior Publication Data

US 2018/0103196 A1    Apr. 12, 2018

(30) Foreign Application Priority Data

Oct. 10, 2016   (KR) .................. 10-2016-0130942

(51) Int. Cl.
| | |
|---|---|
| *H04N 5/232* | (2006.01) |
| *H04N 13/117* | (2018.01) |
| *H04N 13/156* | (2018.01) |
| *H04N 5/247* | (2006.01) |
| *H04N 5/445* | (2011.01) |
| *H04N 13/00* | (2018.01) |

(Continued)

(52) U.S. Cl.
CPC ..... *H04N 5/23222* (2013.01); *H04N 5/23216* (2013.01); *H04N 5/23238* (2013.01); *H04N 5/23293* (2013.01); *H04N 5/247* (2013.01); *H04N 5/44504* (2013.01); *H04N 13/117* (2018.05); *H04N 13/156* (2018.05); *G06F 3/0488* (2013.01); *G06F 3/04842* (2013.01); *H04N 2013/0074* (2013.01)

(58) Field of Classification Search
CPC ........... H04N 5/23238; H04N 5/23222; H04N 5/23216; H04N 5/23293; H04N 5/247; H04N 5/2251; H04N 5/2258; H04N 2013/0074; H04N 2013/0088; H04N 13/00; H04N 13/156; H04N 13/117
See application file for complete search history.

(56) References Cited

U.S. PATENT DOCUMENTS

| | | | |
|---|---|---|---|
| 9,055,216 B1 | 6/2015 | Taylor | |
| 9,479,732 B1 * | 10/2016 | Saleh | .................... H04N 5/3572 |
| 10,401,955 B2 * | 9/2019 | Song | .................. H04N 5/23238 |

(Continued)

FOREIGN PATENT DOCUMENTS

| | | |
|---|---|---|
| EP | 2770723 | 8/2014 |
| EP | 2779621 | 9/2014 |

OTHER PUBLICATIONS

European Patent Office Application Serial No. 17000687.8, Search Report dated Aug. 11, 2017, 8 pages.

*Primary Examiner* — James R Sheleheda
(74) *Attorney, Agent, or Firm* — Lee, Hong, Degerman, Kang & Waimey

(57) ABSTRACT

A mobile terminal includes: a display; and a controller configured to: cause the display to display a plurality of videos captured by a 360-degree camera; generate a 360-degree video by combining or stitching the plurality of videos; and cause the display to display a stitching region corresponding to a focused photographing object when the focused photographing object included in the 360-degree video is placed in the stitching region that is a boundary region in which at least two of the plurality of videos are connected.

20 Claims, 29 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 2002/0057279 A1* | 5/2002 | Jouppi | G06T 3/4038 345/619 |
| 2011/0286684 A1* | 11/2011 | Jin | G06T 3/4038 382/284 |
| 2014/0232818 A1* | 8/2014 | Carr | H04N 5/222 348/36 |
| 2014/0240453 A1 | 8/2014 | Kim et al. | |
| 2014/0267594 A1 | 9/2014 | Furumura et al. | |
| 2014/0347501 A1 | 11/2014 | Ishida | |
| 2015/0070523 A1* | 3/2015 | Chao | H04N 5/23216 348/218.1 |
| 2015/0271395 A1 | 9/2015 | Taylor | |
| 2016/0080647 A1* | 3/2016 | Kimura | H04N 1/3876 348/36 |
| 2016/0269633 A1 | 9/2016 | Ishida | |
| 2018/0063426 A1* | 3/2018 | Rissa | H04N 5/23238 |
| 2018/0075635 A1* | 3/2018 | Choi | H04N 13/204 |
| 2018/0095533 A1* | 4/2018 | Song | H04N 5/23238 |
| 2018/0205885 A1* | 7/2018 | Kimura | G06T 3/0012 |

* cited by examiner

SIDE VIDEO 2 (SIDE CAMERA 2) | SIDE VIDEO 1 (SIDE CAMERA 1) | FRONT VIDEO (FRONT CAMERA) | SIDE VIDEO 2 (SIDE CAMERA 2)

----- STITCHING

FIG. 6A
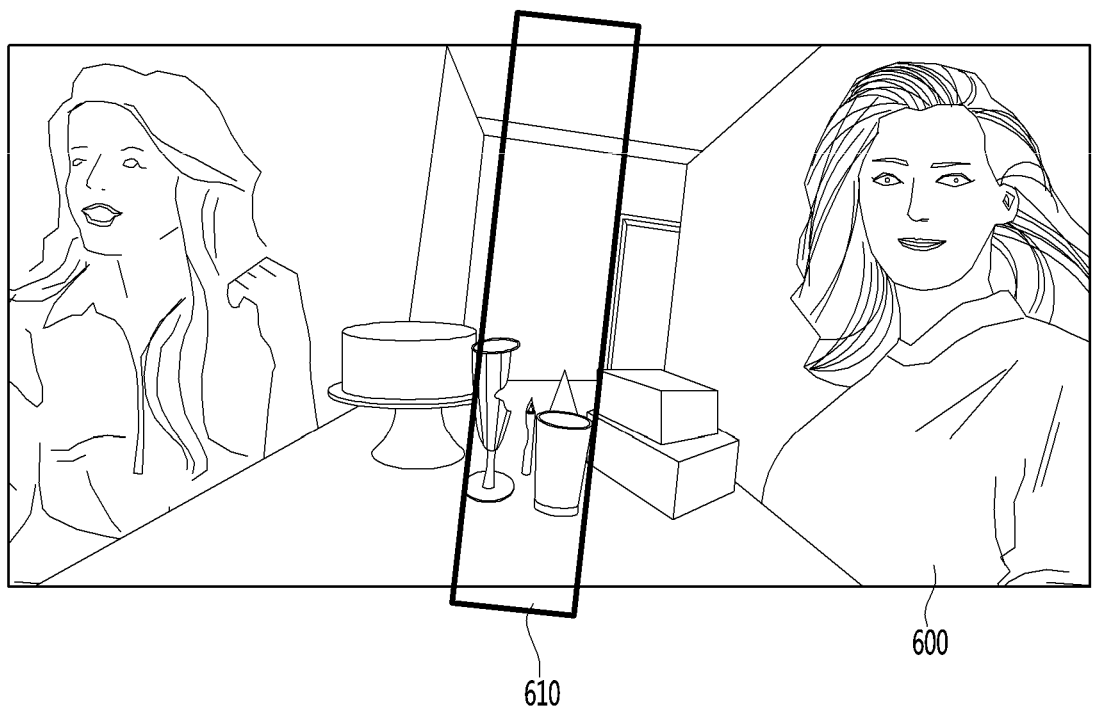
FIG. 6B
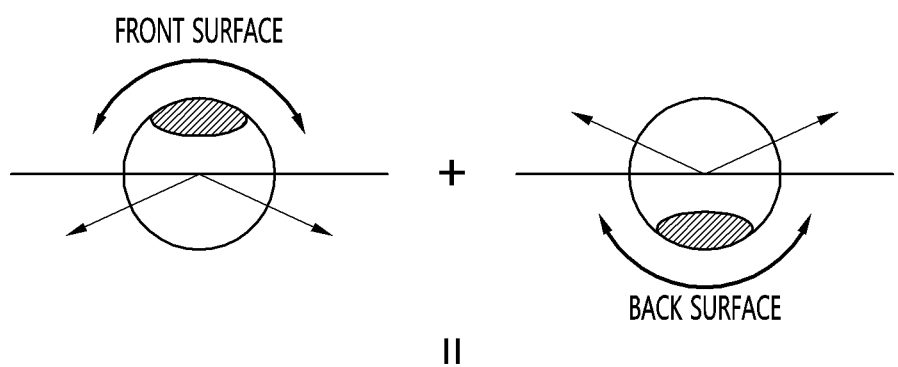
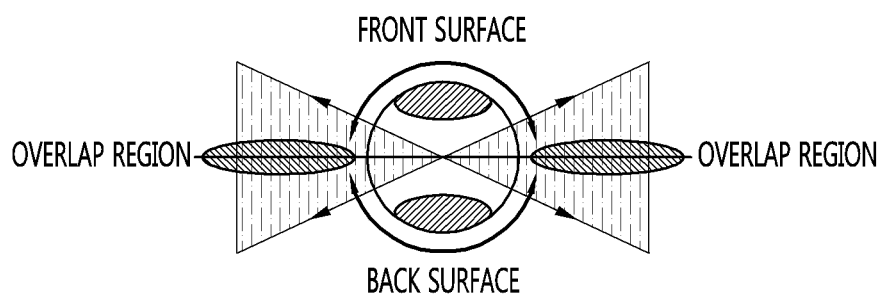

FIG. 12C
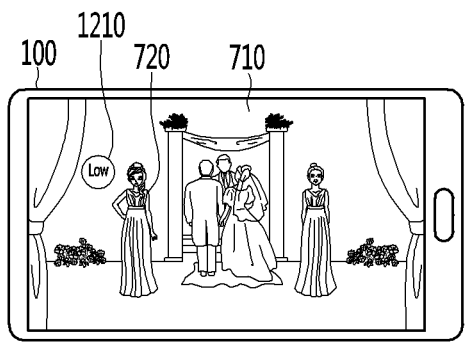
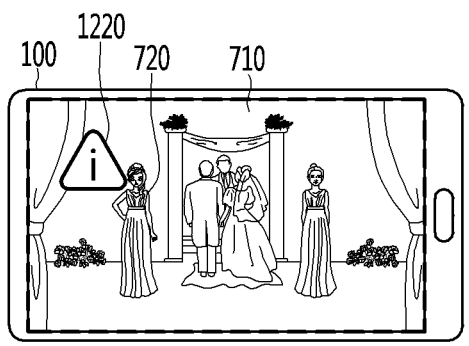
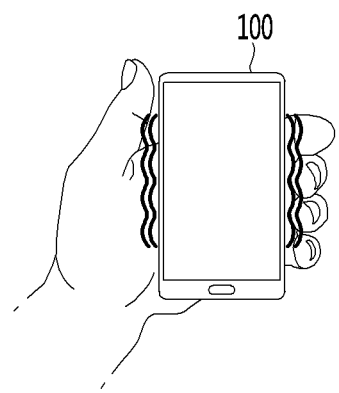
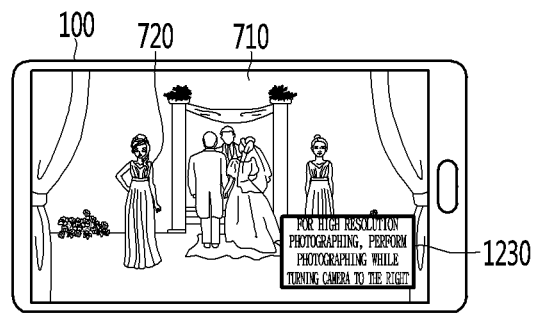

FIG. 13B
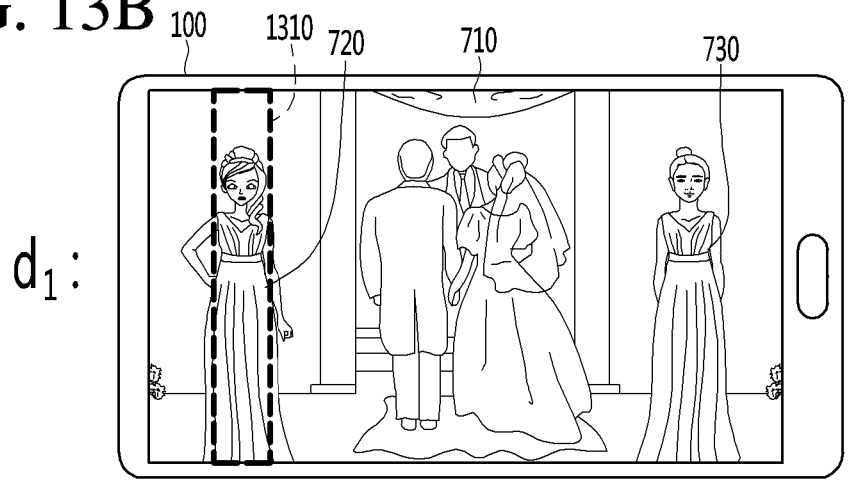
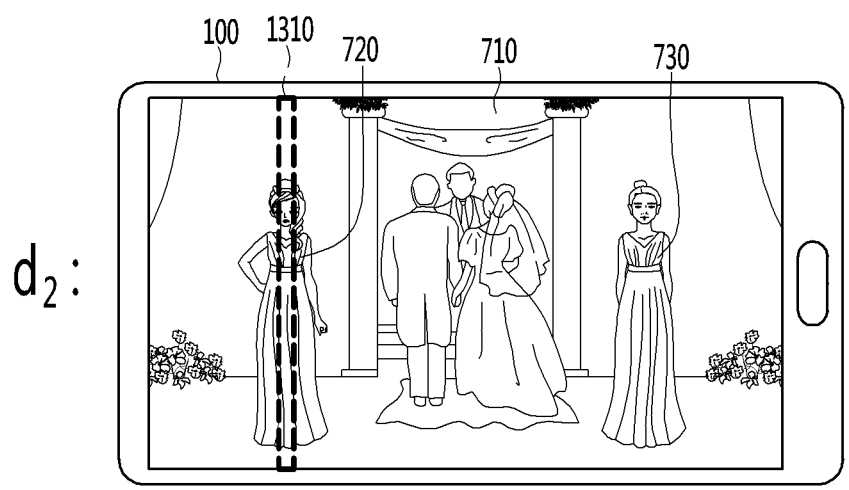
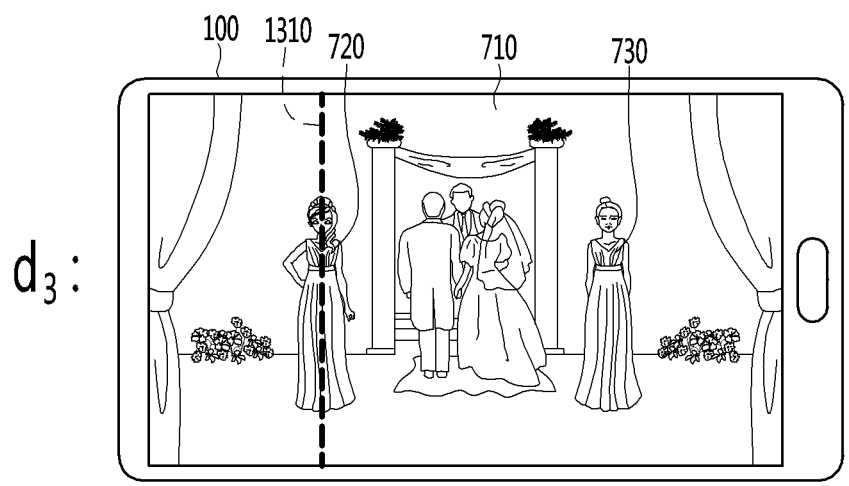

MOBILE TERMINAL AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2016-0130942, filed on Oct. 10, 2016, the contents of which are hereby incorporated by reference herein in its entirety.

BACKGROUND

The present disclosure relates to a mobile terminal and an operating method thereof, and more particularly, to a mobile terminal and an operating method thereof, which are capable of providing a guide related to a stitching region, resolution, and the like influencing quality of a 360-degree video at the time of capturing the 360-degree video.

Depending on whether terminals are movable, the terminals are divided into mobile/portable terminals and stationary terminals. Again, the mobile terminals may be divided into handheld terminals and vehicle mounted terminals depending on whether users can carry the mobile terminals personally.

Functions of the mobile terminals become diversified. For example, the functions include data and voice communication, image capturing and video recording through a camera, voice recording, music file playback through a speaker system, and an image or video output to a display unit. Some terminals may have an additional electronic game play function or a multimedia player function. Especially, recent mobile terminals may receive multicast signals for providing visual contents such as broadcasts and video or television programs.

As functions of a terminal are diversified, such a terminal may be implemented in a form of a multimedia player with multi-functions, for example, image or video capturing, playback of music or video files, game plays, and broadcast reception.

Mobile terminals may play a 360-degree video. The 360-degree video means a virtual reality (VR) video having a view angle of 360°. Unlike an existing video which displays only a video at a time point selected by a user, the 360-degree video may display a video in a direction or at a point selected by the user. In addition, since the 360-degree video has a view angle of 360°, the 360-degree video may display a video in an omni-direction to the user while turning by an angle of 360°.

The 360-degree video is produced by connecting a plurality of videos captured by a plurality of cameras. In this case, a distortion phenomenon such as a dislocation or discoloration may be generated in a boundary region in which the plurality of videos are connected. Video stitching is inevitable when the 360-degree video is produced, but it is necessary to prevent an object to be photographed and emphasized by a user from being stitched.

Furthermore, the plurality of cameras may differ in resolution or a picture quality. In this case, the plurality of videos respectively captured by the plurality of cameras may differ in resolution or a picture quality, but it is desirable that an object emphasized by the user is photographed at high resolution.

SUMMARY

Embodiments provide a mobile terminal and an operating method thereof, which are capable of providing a photographing guide for a stitching region and resolution influencing quality of a 360-degree video at the time of capturing the 360-degree video.

Further scope of the applicability of the present disclosure will become apparent from the following detailed description. It should be understood, however, that the specific examples, while indicating preferred embodiments of the present disclosure, are presented for illustration only. Various changes and modifications within the spirit and scope of the present disclosure should become apparent to those skilled in the art from this detailed description.

In one embodiment, a mobile terminal includes: a display; and a controller configured to: cause the display to display a plurality of videos captured by a 360-degree camera; generate a 360-degree video by combining or stitching the plurality of videos; and cause the display to display a stitching region corresponding to a focused photographing object when the focused photographing object included in the 360-degree video is placed in the stitching region that is a boundary region in which at least two of the plurality of videos are connected.

In another embodiment, a method of operating a mobile terminal, the method includes: displaying a plurality of videos captured by a 360-degree camera; generating a 360-degree video by combining or stitching the plurality of videos; and displaying a stitching region corresponding to a focused photographing object when the focused photographing object included in the 360-degree video is placed in the stitching region that is a boundary region in which at least two of the plurality of videos are connected.

BRIEF DESCRIPTION OF THE DRAWINGS

FIGS. 6A to 6D are diagrams illustrating issues in a case where a 360-degree video is produced by performing a stitching operation.

FIGS. 12A to 12C are diagrams illustrating an example in which a mobile terminal according to an embodiment of the present disclosure provides a photographing guide such that a focused object is photographed at high resolution.

FIGS. 13A and 13B are diagrams illustrating an example in which a mobile terminal according to an embodiment of the present disclosure displays a stitching region in accordance with a distance from a photographing object.

DETAILED DESCRIPTION OF THE EMBODIMENTS

Figure 1:
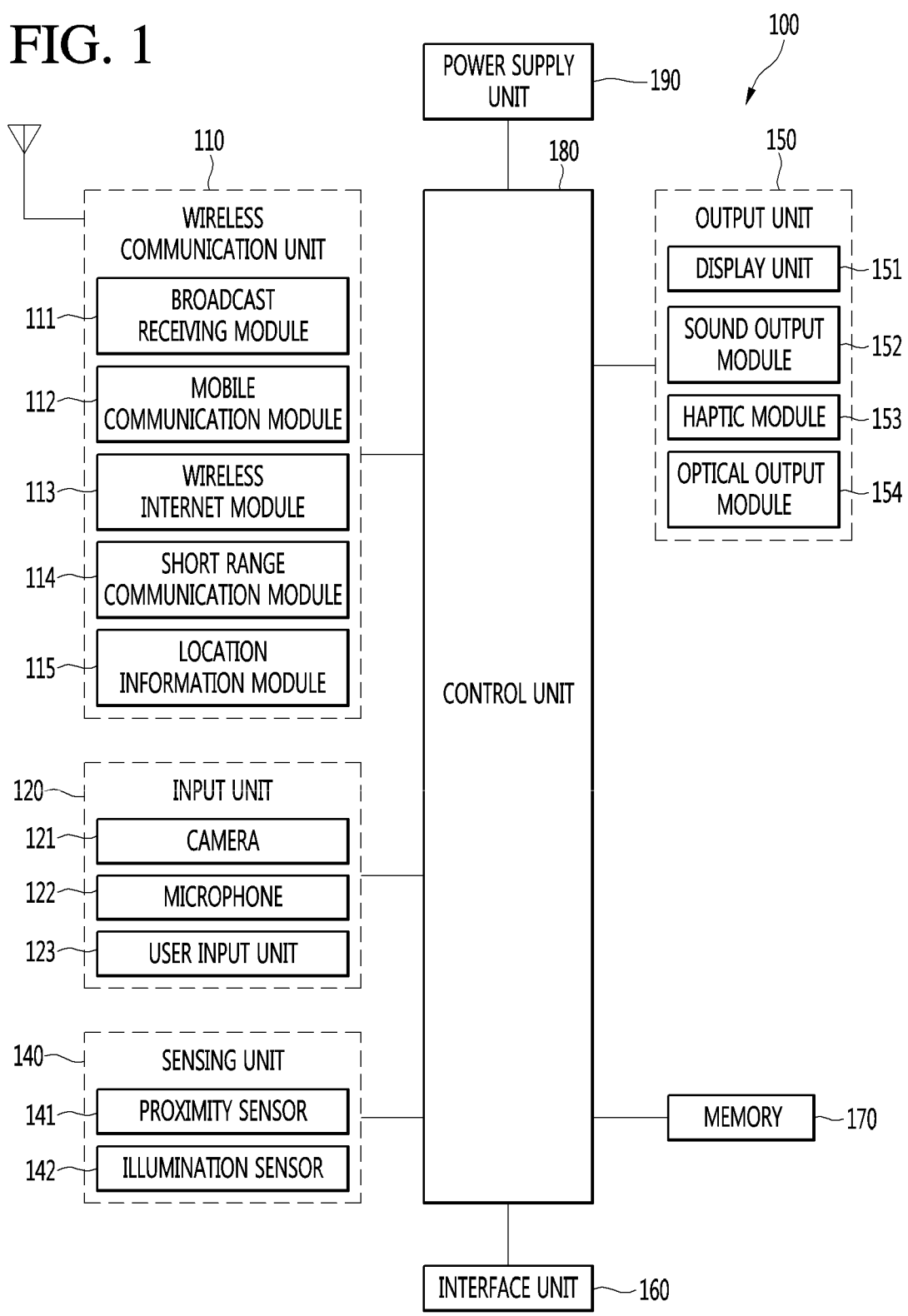
FIG. 1 is a block diagram illustrating a mobile terminal according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Mobile terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smart watches, smart glasses, and head mounted displays (HMDs)).

However, it is apparent to those skilled in the art that configurations according to embodiments of the present disclosure disclosed in this specification are applicable to stationary terminals such as digital TVs, desktop computers, and digital signage, except for the case applicable to only mobile terminals.

FIG. 1 is a block diagram illustrating a mobile terminal according to an embodiment of the present disclosure.

The mobile terminal 100 may include a wireless communication unit 110, an input unit 120, a sensing unit 140, an output unit 150, an interface unit 160, a memory 170, a control unit or controller 180, and a power supply unit 190. In implementing a mobile terminal, components shown in FIG. 1 are not necessary, so that a mobile terminal described in this specification may include components less or more than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast receiving module 111, a mobile communication module 112, a wireless Internet module 113, a short-range communication module 114, and a location information module 115.

The input unit 120 may include a camera 121 or an image input unit for image signal input, a microphone 122 or an audio input unit for receiving audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, and an optical output module 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands for operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information inputted/outputted through the above components or executing application programs stored in the memory 170.

Additionally, in order to execute an application program stored in the memory 170, the control unit 180 may control at least part of the components shown in FIG. 1. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present disclosure described below. Additionally, the operations, controls, or control methods of a mobile terminal 100 may be implemented on the mobile terminal 100 by executing at least one application program stored in the memory 170.

Hereinafter, prior to examining various embodiments implemented through the mobile terminal 100, the above-listed components are described in more detail with reference to FIG. 1.

First, in describing the wireless communication unit 110, the broadcast receiving module 111 of the wireless communication unit 110 may receive a broadcast signal and/or broadcast related information from an external broadcast management server through a broadcast channel. The broadcast channel may include a satellite channel and a terrestrial channel. At least two broadcast receiving modules for simultaneous broadcast reception for at least two broadcast channels or broadcast channel switching may be provided to the mobile terminal 100.

The broadcast management server may refer to a server for generating and transmitting broadcast signals and/or broadcast related information or a server for receiving pre-generated broadcast signals and/or broadcast related information and transmitting them to a terminal. The broadcast signals may include TV broadcast signals, radio broadcast signals, and data broadcast signals and also may include broadcast signals in a combination format thereof.

The broadcast signal may be encoded according to at least one of technical standards (or broadcast methods, for example, ISO, IEC, DVB, and ATSC) for transmitting/receiving digital broadcast signals and the broadcast receiving module 111 may receive the digital broadcast signals by using a method appropriate to the technical specifications set by the technical standards.

The broadcast related information may refer to information relating to broadcast channels, broadcast programs, or broadcast service providers. The broadcast related information may be provided through a mobile communication network. In such a case, the broadcast related information may be received by the mobile communication module 112.

The broadcast related information may exist in various formats such as Electronic Program Guide (EPG) of Digital Multimedia Broadcasting (DMB) or Electronic Service Guide (ESG) of Digital Video Broadcast-Handheld (DVB-H). Broadcast signals and/or broadcast related information received through the broadcast receiving module 111 may be stored in the memory 170.

The mobile communication module 112 may transmit/receive a wireless signal to/from at least one of a base station, an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

From the viewpoint that wireless internet access by WiBro, HSDPA, HSUPA, GSM, CDMA, WCDMA, LTE, and LTE-A is achieved through a mobile communication network, the wireless Internet module 113 performing wireless internet access through the mobile communication network may be understood as one type of the mobile communication module 112.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (for example, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user may perform a phone call through the wearable device or when a message is received by the mobile terminal 100, a user may check the received message.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position on the basis of information of a wireless access point (AP) transmitting/receiving a wireless signal to/from the Wi-Fi module, through the Wi-Fi module. If necessary, the location information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information inputted from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be inputted to the mobile terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the control unit may control an operation of the mobile terminal 100 to correspond to the inputted information. The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen. Moreover, the virtual key or visual key may have various forms and may be disposed on a touch screen and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. On the basis of such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor. If the touch screen is a capacitive type, the proximity sensor 141 may be configured to detect the proximity of an object by changes in an electric field according to the proximity of the object having conductivity. In this case, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch), long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical signal is much shorter than a time that ultrasonic wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image.

A three-dimensional display method, for example, a stereoscopic method (a glasses method), an autostereoscopic (no glasses method), a projection method (a holographic method) may be applied to the three-dimensional display unit.

In general, a 3D image includes a left image (for example, an image for the left eye) and a right image (for example, an image for the right eye). Depending on a method of combining a left image and a right image into a 3D image, the method includes a top-down method of disposing a left image and a right vertically in one frame, a left-to-right (or side by side) method of disposing a lift image and a right image horizontally in one frame, a checker board method of disposing pieces of a left image and a right image in a tile form, an interlaced method of disposing a left image and a right image in a column unit or a row unit alternately, and a time sequential (or frame by frame) method of displaying a left image and a right image alternately at each time.

Additionally, a 3D thumbnail image may generate a left image thumbnail and a right image thumbnail respectively from the left image and the right image of an original image frame, and as they are combined, one image may be generated. In general a thumbnail means a reduced image or a reduced still image. The left image thumbnail and the right image thumbnail, generated in such a way, are displayed with a left and right distance difference on a screen by a depth corresponding to a time difference of a left image and a right image.

A left image and a right image, necessary for the implantation of a 3D image may be displayed on a 3D display unit through a 3D processing unit. The 3D processing unit receives a 3D image (that is, an image at a reference time point and an image at an extended time point) and sets a left image and a right image by using it, or receives a 2D image and switches it into a left image and a right image.

The sound output module 152 may output audio data received from the wireless communication unit 110 or stored in the memory 170 in a call signal reception or call mode, a recording mode, a voice recognition mode, or a broadcast reception mode. The sound output module 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal outputted from the optical output module 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals inputted from the cradle are delivered to the mobile terminal 100 by a user. The various command signals or the power inputted from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds outputted during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging.

Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this case, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments below may be implemented in a computer or device similar thereto readable medium by using software, hardware, or a combination thereof.

Then, a communication system using the mobile terminal 100 is described according to an embodiment of the present disclosure.

First, the communication system may use different wireless interfaces and/or physical layers. For example, a wireless interface available to the communication system may include Frequency Division Multiple Access (FDMA), Time Division Multiple Access (TDMA), Code Division Multiple Access (CDMA), and Universal Mobile Telecommunications Systems (UMTS) (especially, Long Term Evolution (LTE), Long Term Evolution-Advanced (LTE-A), and Global System for Mobile Communications (GSM)).

Hereinafter, for convenience of description, description is made limited to CDMA. However, it is apparent that the present disclosure is applicable to all communication systems including Orthogonal Frequency Division Multiplexing (OFDM) wireless communication systems in addition to CDMA wireless communication systems.

The CDMA wireless communication system may include at least one terminal 100, at least one base station (BS) (it may be referred to as Node B or Evolved Node B), at least one base station controllers (BSCs), and a mobile switching center (MSC). MSC may be configured to be connected to Public Switched Telephone Network (PSTN) and BSCs. BSCs may be connected being paired with a BS through a backhaul line. The backhaul line may be provided according to at least one of E1/T1, ATM, IP, PPP, Frame Relay, HDSL, ADSL, and xDSL. Accordingly, a plurality of BSCs may be included in a CDMA wireless communication system.

Each of a plurality of BSs may include at least one sensor and each sensor may include an omni-directional antenna or an antenna indicating a specific radial direction from a BS. Additionally, each sensor may include at least two antennas in various forms. Each BS may be configured to support a plurality of frequency allocations and each of the plurality of frequency allocations may have a specific spectrum (for example, 1.25 MHz, 5 MHz, and so on).

The intersection of a sector and a frequency allocation may be referred to as a CDMA channel. A BS may be referred to as a Base Station Transceiver Subsystem (BTS). In such a case, one BSC and at least one BS together may be referred to as "BS". A BS may also represent "cell site". Additionally, each of a plurality of sectors for a specific BS may be referred to as a plurality of cell sites.

A Broadcasting Transmitter (BT) transmits broadcast signals to the terminals 100 operating in a system. The broadcast receiving module 111 shown in FIG. 1 is provided in the terminal 100 for receiving broadcast signals transmitted from the BT.

Additionally, GPS may be linked to a CDMA wireless communication system in order to check the location of the mobile terminal 100. Then, a satellite helps obtaining the location of the mobile terminal 100. Useful location information may be obtained by at least one satellite. Herein, the location of the mobile terminal 100 may be traced by using all techniques for tracing the location in addition to GPS tracking technique. Additionally, at least one GPS satellite may be responsible for satellite DMB transmission selectively or additionally.

The location information module 115 in a mobile terminal is for detecting and calculating the position of the mobile terminal and its representative example may include a GPS module and a WiFi module. If necessary, the location information module 115 may perform a function of another module in the wireless communication unit 110 in order to obtain data on the location of the mobile terminal substitutionally or additionally.

The GPS module or location information module 115 may calculate information on a distance from at least three satellites and accurate time information and then apply triangulation to the calculated information, in order to accurately calculate the 3D current location information according to latitude, longitude, and altitude. A method for calculating location and time information by using three satellites and correcting errors of the calculated location and time information by using another one satellite is being widely used. Additionally, the GPS module 115 may speed information as continuously calculating the current location in real time. However, it is difficult to accurately measure the location of a mobile terminal by using a GPS module in a shadow area of a satellite signal such as a room. Accordingly, in order to compensate for the measurement of a GPS method, a WiFi Positioning System (WPS) may be utilized.

WPS is a technique for tracking the location of the mobile terminal 100 by using a WiFi module in the mobile terminal 100 and a wireless Access Point (AP) for transmitting or receiving wireless signals to or from the WiFi module and may mean a Wireless Local Area Network (WLAN) based location measurement technique using WiFi.

A WiFi location tracking system may include a WiFi location measurement server, a mobile terminal 100, a wireless AP connected to the mobile terminal 100, and a database for storing arbitrary wireless AP information.

The mobile terminal 100 in access to a wireless AP may transmit a location information request message to a WiFi location measurement server.

The WiFi location measurement server extracts information of a wireless AP connected to the mobile terminal 100 on the basis of a location information request message (or signal) of the mobile terminal 100. Information of a wireless AP connected to the mobile terminal 100 may be transmitted to the WiFi location measurement server through the mobile terminal 100 or may be transmitted from a wireless AP to a WiFi location measurement server.

Based on the location information request message of the mobile terminal 100, the extracted information of a wireless AP may be at least one of MAC Address, Service Set Identification (SSID), Received Signal Strength Indicator (RSSI), Reference Signal Received Power (RSRP), Reference Signal Received Quality (RSRQ), channel information, Privacy, Network Type, Signal Strength, and Noise Strength.

As mentioned above, the WiFi position measurement server may extract wireless AP information corresponding to a wireless AP that the mobile terminal 100 access from a pre-established database by using information of the wireless AP connected to the mobile terminal 100. At this point, information of arbitrary wireless APs stored in the database may information such as MAC Address, SSID, channel information, Privacy, Network Type, latitude and longitude coordinates of a wireless AP, a building name where a wireless AP is located, the number of floors, indoor detailed location (GPS coordinates available), the address of the owner of an AP, and phone numbers. At this point, in order to remove a mobile AP or a wireless AP provided using illegal MAC address during a measurement process, a WiFi location measurement server may extract only a predetermined number of wireless AP information in high RSSI order.

Then, the WiFi location measurement server may extract (or analyze) the location information of the mobile terminal 100 by using at least one wireless AP information extracted from the database. By comparing the included information and the received wireless AP information, location information of the mobile terminal 100 is extracted (or analyzed).

As a method of extracting (or analyzing) the location information of the motile terminal 100, a Cell-ID method, a finger-print method, a triangulation method, and a landmark method may be used.

The Cell-ID method is a method for determining the location of a wireless AP having the strongest signal intensity in neighbor wireless AP information that a mobile terminal collects as the location of the mobile terminal. Implementation is simple, no additional cost is required, and location information is obtained quickly but when the installation density of wireless APs is low, measurement precision is poor.

The finger-print method is a method for collecting signal intensity information by selecting a reference location from a service area and estimating the location through signal intensity information transmitted from a mobile terminal on the basis of the collected information. In order to use the finger-print method, there is a need to provide a database for storing propagation characteristics in advance.

The triangulation method is a method for calculating the location of a mobile terminal on the basis of a distance between coordinates of at least three wireless APs and a mobile terminal. In order to measure a distance between a mobile terminal and a wireless AP, a signal intensity converted into distance information, Time of Arrival (ToA), Time Difference of Arrival (TDoA), and Angle of Arrival (AoA) may be used.

The landmark method is a method for measuring the location of a mobile terminal by using a landmark transmitter knowing the location.

In addition to the listed methods, a variety of algorithms may be utilized as methods for extracting (or analyzing) the location information of a mobile terminal.

As the extracted location information of the mobile terminal 100 is transmitted to the mobile terminal 100 through the WiFi location measurement server, the mobile terminal 100 may obtain the location information.

As connected to at least one wireless AP, the mobile terminal 100 may obtain location information. At this point, the number of wireless APs, which are required for obtaining the location information of the mobile terminal 100, may vary according to a wireless communication environment where the mobile terminal 100 is located.

Figure 2:
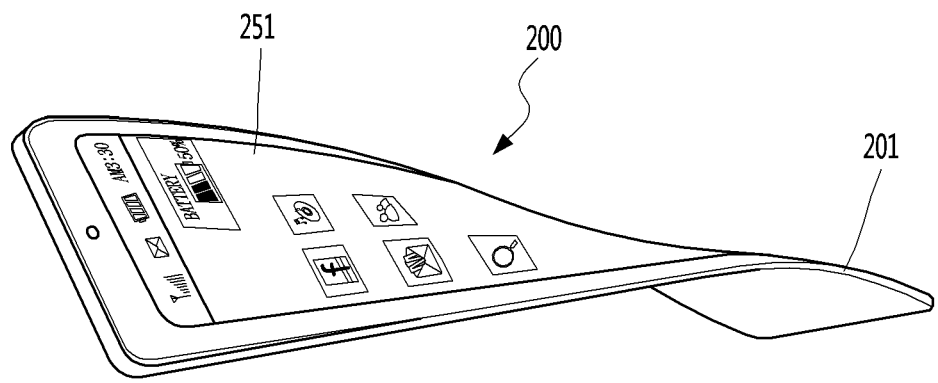
FIG. 2 is a conceptual diagram illustrating of a transformable mobile terminal according to another embodiment of the present disclosure.

FIG. 2 is a conceptual diagram illustrating a transformable mobile terminal 200 according to an embodiment of the present disclosure.

As shown in the drawing, a display unit 251 may be transformed by external force. The transformation may be at least one of warping, bending, folding, twisting, and curling of the display unit 251. Additionally, the transformable display unit 251 may be referred to as a flexible display. Herein, the flexible display unit 251 may include a general flexible display, an e-paper, and a combination thereof. In general, the mobile terminal 200 may have the same or similar features to the mobile terminal of FIG. 1.

The general flexible display is a light and durable display maintaining the feature of an existing flat panel display and manufactured on a thin flexible substrate where warping, bending, folding, twisting, and curling are possible.

Additionally, the e-paper uses a display technique applying the feature of a general ink and is different from an existing flat panel display in that it uses reflected light. The e-paper may change information by using electrophoresis with a twist ball or a capsule.

When the flexible display unit 251 is not transformed (for example, a state having an infinite curvature radius, hereinafter referred to as a first state), the display area of the flexible display unit 251 becomes flat. When the flexible display unit 251 is transformed by external force in the first state (for example, a state having a finite curvature radius, hereinafter referred to as a second state), the display area of the flexible display unit 251 becomes a curved surface. As shown in the drawing, information displayed in the second state may be visual information outputted on the curved surface. Such visual information may be implemented by separately controlling the light emission of a sub-pixel disposed in a matrix. The sub-pixel means a minimum unit for implementing one color.

The flexible display unit 251 may be in a warping state (for example, a vertically or horizontally warped state) instead of a flat state during the first state. In this case, when external force is applied to the flexible display unit 251, the flexible display unit 251 may be transformed into a flat state (or a less warped state) or a more warped state.

Moreover, the flexible display unit 251 may be combined with a touch sensor to implement a flexible touch screen. When a touch is made on the flexible touch screen, the control unit 180 of FIG. 1 may perform a control corresponding to such a touch input. The flexible touch screen may be configured to detect a touch input in both the first state and the second state.

Moreover, the mobile terminal 200 according to a modified embodiment of the present disclosure may include a transformation detection means for detecting the transformation of the flexible display unit 251. Such a transformation detection means may be included in the sensing unit 140 of FIG. 1.

The transformation detection means may be provided at the flexible display unit 251 or the case 201, so that it may detect information relating to the transformation of the flexible display unit 251. Herein, the information relating to transformation may include a direction in which the flexible display unit 251 is transformed, the degree of transformation, a position where the flexible display unit 251 is transformed, a time that the flexible display unit 251 is transformed, and a restoring acceleration of the flexible display unit 251 and may further include various detectable information due to the warping of the flexible display unit 251.

Additionally, on the basis of information relating to the transformation of the flexible display unit 251 detected by the transformation detection means, the control unit 180 may change the information displayed on the display unit 251 or may generate a control signal for controlling a function of the mobile terminal 200.

Moreover, the mobile terminal 200 according to a modified embodiment of the present disclosure may include a case 201 for receiving the flexible display unit 251. The case 201 may be configured to be transformed together with the flexible display unit 251 by external force in consideration of characteristics of the flexible display unit 251.

Furthermore, a battery (not shown) equipped in the mobile terminal 200 may be configured to be transformed together with the flexible display unit 251 by external force in consideration of characteristics of the flexible display unit 251. In order to implement the battery, a stack and folding method for stacking up battery cells may be applied.

A transformed state of the flexible display unit 251 is not limited to external force. For example, when the flexible display unit 251 has the first state, it is transformed into the second state by a command of a user or an application.

Moreover, a mobile terminal may expand to a wearable device that can be worn on the body beyond the level that a user mainly grabs the mobile terminal by a hand. Such a wearable device may include a smart watch, a smart glass, and an HMD. Hereinafter, examples of a mobile terminal expanding to a wearable device are described.

The wearable device may exchange data (or interoperate) with another mobile terminal 100. The short-range communication module 114 may detect (or recognize) a wearable device around the mobile terminal 100, which is capable of communicating with the mobile terminal 100 Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user may use the data processed in the mobile terminal 100 through the wearable device. For example, when a call is received by the mobile terminal 100, a user may perform a phone call through the wearable device or when a message is received by the mobile terminal 100, a user may check the received message.

Figure 3:
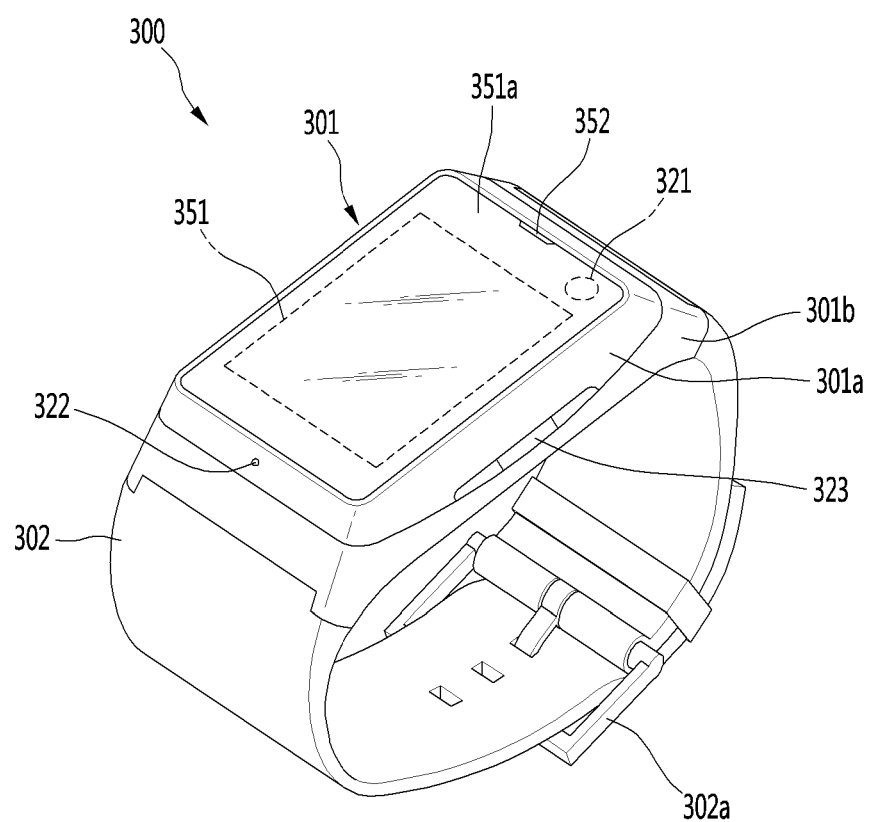
FIG. 3 is a perspective view illustrating a watch type mobile terminal according to another embodiment of the present disclosure.

FIG. 3 is a perspective view illustrating a watch type mobile terminal 300 according to another embodiment of the present disclosure.

Referring to FIG. 3, the watch type mobile terminal 300 includes a body 301 including a display unit 351 and a band 302 connected to the body 301 to be worn on a wrist. In general, the mobile terminal 300 may have the same or similar features to the mobile terminal of FIG. 1.

The main body 301 includes a case for forming the appearance. As shown in the drawings, the case includes a first case 301a and a second case 301b preparing an inner space that receives various electronic components. However, the present disclosure is not limited thereto and one case may be configured to prepare the inner space so that the unibody mobile terminal 300 may be implemented.

The watch type mobile terminal 300 may be configured to allow wireless communication and an antenna for the wireless communication may be installed at the body 301. Moreover, the antenna may expand its performance by using a case. For example, a case including a conductive material may be configured to be electrically connected to an antenna in order to expand a ground area or a radiation area.

The display unit 351 is disposed at the front of the body 301 to output information and a touch sensor is equipped at the display unit 351 to be implemented as a touch screen. As shown in the drawing, a window 351a of the display unit 351 is mounted at the first case 301a to form the front of the terminal body together with the first case 301a.

The body 301 may include a sound output unit 352, a camera 321, a microphone 322, and a user input unit 323. When the display unit 351 is implemented as a touch screen, it may function as the user input unit 323 and accordingly, there is no additional key at the body 301.

The band 302 is worn on a wrist to wrap it and may be formed of a flexible material in order for easy wearing. As such an example, the band 302 may be formed of leather, rubber, silicon, and synthetic resin. Additionally, the band 302 may be configured to be detachable from the body 301, so that it may be replaced with various forms of bands according to user preferences.

Moreover, the band 302 may be used to expand the performance of an antenna. For example, a ground expansion unit (not shown) electrically connected to an antenna to expand a ground area may be built in a band.

The band 302 may include a fastener 302a. The fastener 302a may be implemented by a buckle, a snap-fit available hook structure, or VELCRO (a brand name) and may include a stretchable interval or material. This drawing illustrates an example that the fastener 302a is implemented in a buckle form.

Figure 4:
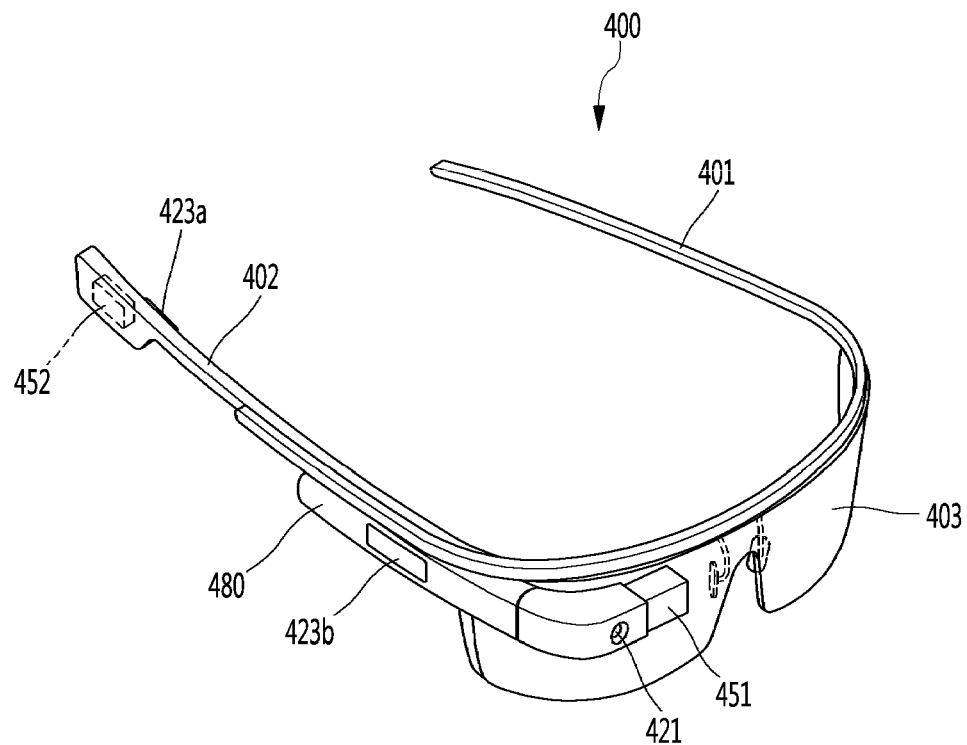
FIG. 4 is a perspective view illustrating a glass type mobile terminal according to another embodiment of the present disclosure.

FIG. 4 is a perspective view illustrating a glass type mobile terminal according to another embodiment of the present disclosure.

The glass type mobile terminal 400 may be configured to be worn on the head portion of a human body and for this, may include a frame part (for example, a case and a housing). The frame part may be formed of a flexible material in order for each wearing. In this drawing, the frame part includes a first frame 401 and a second frame 402 formed of different materials. In general, the mobile terminal 400 may have the same or similar features to the mobile terminal of FIG. 1.

The frame part is supported by the head portion and provides a space for mounting various components. As shown in the drawing, electronic components such as a control module 480 and a sound output module 452 may be mounted at the frame part. Additionally, a lens 403 covering at least one of the left eye and the right eye may be detachably mounted at the frame part.

The control module 480 may be configured to control various electronic components equipped at the mobile terminal 400. The control module 480 may be understood as a component corresponding to the above-described control unit 180. In this drawing, the control module 480 is installed at the frame part on one side of the head portion. However, the position of the control module 480 is not limited thereto.

The display unit 451 may be implemented in an HMD form. The HMD form refers to a display method for displaying an image directly in front of the user's eyes. When a user wears a glass type mobile terminal 400, in order to provide an image directly in front of the user's eyes, the display unit 451 may be disposed in correspondence to at least one of the left eye and the right eye. In this drawing, in order to output an image toward the user's right eye, the display unit 451 is disposed in correspondence to a portion corresponding to the right eye.

The display unit 451 may project an image to the user's eye by using a prism. Additionally, in order to allow a user to see the projected image and a general front view (that is, a range that the user can see through the eyes), the prism may be transparent.

In such a way, an image outputted through the display unit 451 may be overlapped with a general view and displayed. The mobile terminal 400 may provide augmented reality (AR) superimposing a virtual image on a real image or a background and displaying it as one image by using characteristics of such a display.

The camera 421 is disposed adjacent to at least one of the left eye and the right eye to capture a front image. Since the camera 421 is disposed adjacent to the eye, it may obtain an image of a scene that a user sees.

In this drawing, the camera 421 is equipped at the control module 480 but the present disclosure is not limited thereto. The camera 421 may be installed at the frame part and may be provided in plurality to obtain a three-dimensional image.

The glass type mobile terminal 400 may include user input units 423a and 423b manipulated to receive a control command. The user input units 423a and 423b may adopt any method if it is a tactile manner that a user manipulates touch and push with tactile feeling. In this drawing, the user input units 423a and 423b of a push and touch input method are equipped at the frame part and the control module 480, respectively.

Additionally, the glass type mobile terminal 400 may include a microphone (not shown) receiving sound and processing it electrical voice data and a sound output module 452 outputting sound. The sound output module 452 may be configured to deliver sound through a general sound output method or a bone conduction method. When the sound output module 452 is implemented with a bone conduction and a user wears the mobile terminal 400, the sound output module 342 closely contacts the head portion and delivers sound by vibrating the skull.

The mobile terminal 100 performing embodiments described later may include the display unit 151 and the control unit 180.

The display unit 151 displays a plurality of videos captured by a 360-degree camera.

The control unit 180 produces a 360-degree video based on the plurality of videos.

In this case, when a focused photographing object included in the plurality of videos is placed in a stitching region, i.e., a boundary region in which at least two of the plurality of videos are connected, the control unit 180 may display the stitching region corresponding to the focused photographing object. The stitching region may be displayed as a bold dashed-line.

The focused photographing object may be variously set according to embodiments. According to an embodiment, the focused photographing object may include at least one of a human and a thing included in the plurality of videos. According to another embodiment, the focused photographing object may be set by a user.

When the control unit 180 senses an input signal for selecting the stitching region, the control unit 180 may provide a guide for the focused photographing object to avoid the stitching region. The guide may be provided as at least one of a text and a voice.

When the control unit 180 senses that the 360-degree camera is turned, the control unit 180 may remove the stitching region corresponding to the focused photographing object.

Meanwhile, the 360-degree camera may include a plurality of cameras and the plurality of cameras may respectively capture the plurality of videos. In this case, the control unit 180 may display information on each of the plurality of cameras on each of the plurality of videos.

Specifically, the control unit 180 may display information on at least one of resolution, a type, and a position of each of the plurality of cameras on a corresponding video of the plurality of videos. According to an embodiment, the control unit 180 may display a central region of a view angle in each of the plurality of cameras on each of the plurality of videos.

The plurality of cameras may include a low resolution camera and a high resolution camera. In this case, the control unit 180 may display a video captured by the high resolution camera and a video captured by the low resolution camera of the plurality of videos so as to be discriminated from each other. Specifically, the control unit 180 may display a region of the video captured by the high resolution camera as a bold dashed-line. In addition, the control unit 180 may faintly display a region of the video captured by the low resolution camera.

The control unit 180 may change an area of the stitching region in accordance with a distance between the 360-degree camera and the focused photographing object. In this case, the control unit 180 may increase the area of the stitching region as the distance between the 360-degree camera and the focused photographing object is decreased. On the contrary, the control unit 180 may decrease the area of the stitching region as the distance between the 360-degree camera and the focused photographing object is increased.

An operating method of the mobile terminal 100 as configured above includes: displaying a plurality of videos captured by the 360-degree camera; and producing a 360-degree video based on the plurality of videos, wherein when a focused photographing object included in the plurality of videos is placed in a stitching region, that is, a boundary region in which at least two of the plurality of videos are connected, the stitching region corresponding to the focused photographing object is displayed.

According to the present disclosure, the mobile terminal 100 may capture a 360-degree video. Specifically, the mobile terminal 100 may produce the 360-degree video having a spherical shape by capturing a plurality of videos in an omni-direction by using the 360-degree camera provided therein and stitching the plurality of videos. To this end, the mobile terminal 100 may include a 360-degree camera and software necessary for producing the 360-degree video.

According to another embodiment, the mobile terminal 100 may receive a plurality of videos captured by an external 360-degree camera present separately from the mobile terminal 100 and produce a 360-degree video having a spherical shape by stitching the plurality of received videos.

The 360-degree camera may include a plurality of cameras. In this case, each of the plurality of cameras may be disposed at a certain position of the mobile terminal 100 and capture a video having a certain view angle. The plurality of cameras may have the same or different physical properties including resolution, picture quality, and the like.

The software necessary for producing the 360-degree video may include a program for simulating a video having a spherical shape with a video having a plane shape, a stitching program for performing stitching by removing an overlap region or correcting a distortion, a video correction program for correcting a color, a shape, or the like of the 360-degree video, and the like.

In this case, the mobile terminal 100 may produce the 360-degree video having the spherical shape by stitching and connecting the plurality of videos captured by the plurality of cameras.

Meanwhile, depending on the situation, the 360-degree video may mean a plurality of videos captured by the 360-degree camera in a photographing step before a stitching operation or a 360-degree video having a spherical shape produced after the stitching operation.

Hereinafter, embodiments related to a controlling method realized in the mobile terminal 100 as configured above will be described with reference to the accompanying drawings. It is obvious to those skilled in the art that the present disclosure may be embodied in different forms without departing from the sprit and scope of the present disclosure.

Figure 5A:
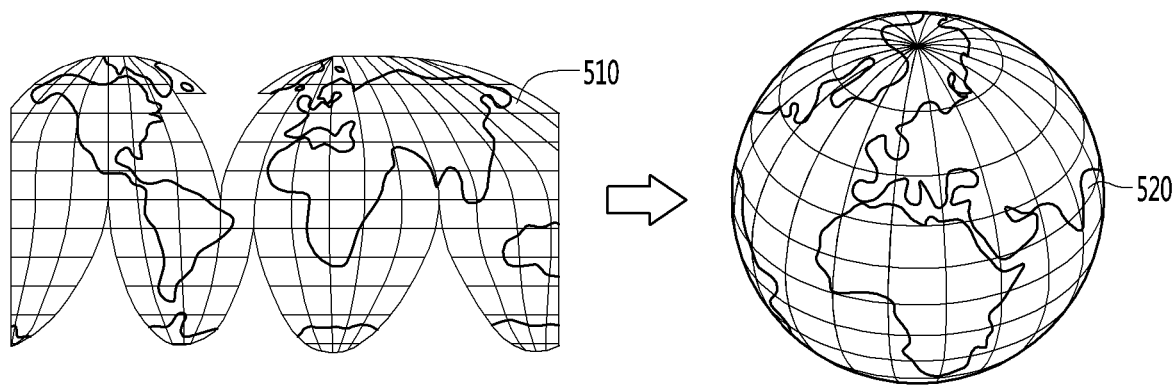
FIGS. 5A to 5C are diagrams illustrating a method of producing a 360-degree video by performing a stitching operation.
Figure 5B:
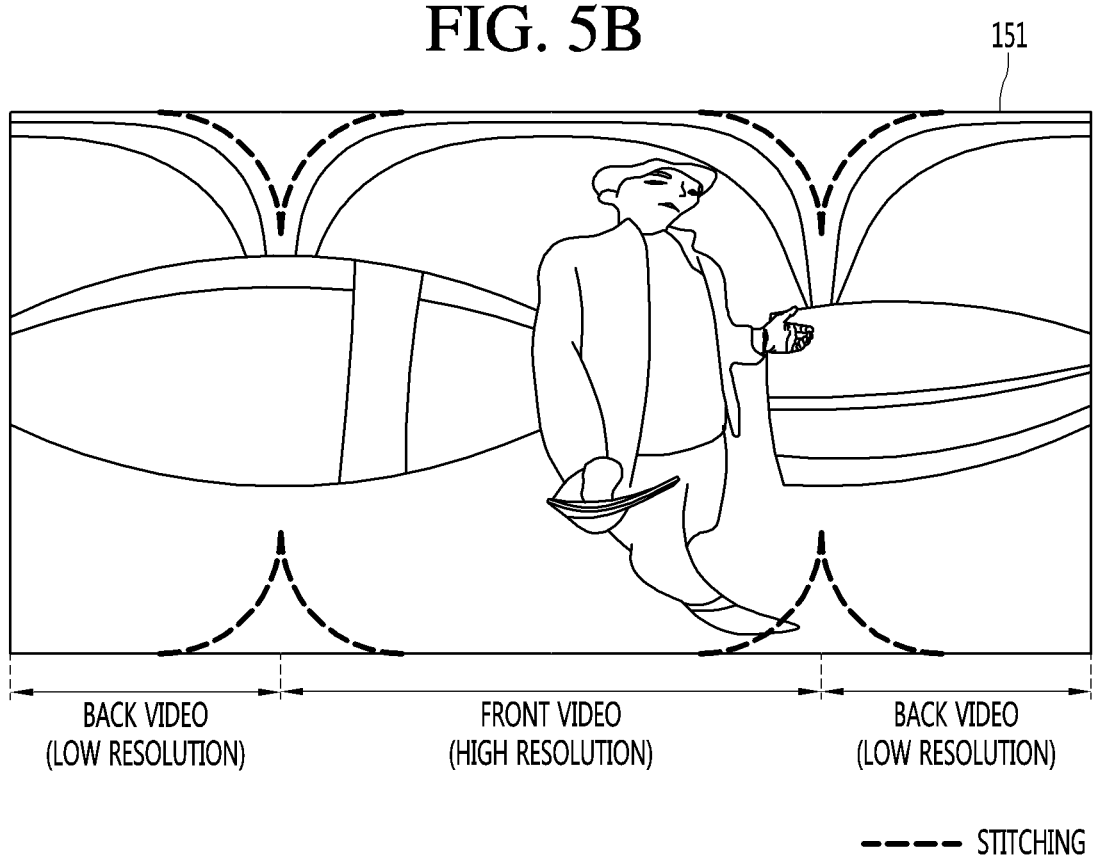
Figure 5C:
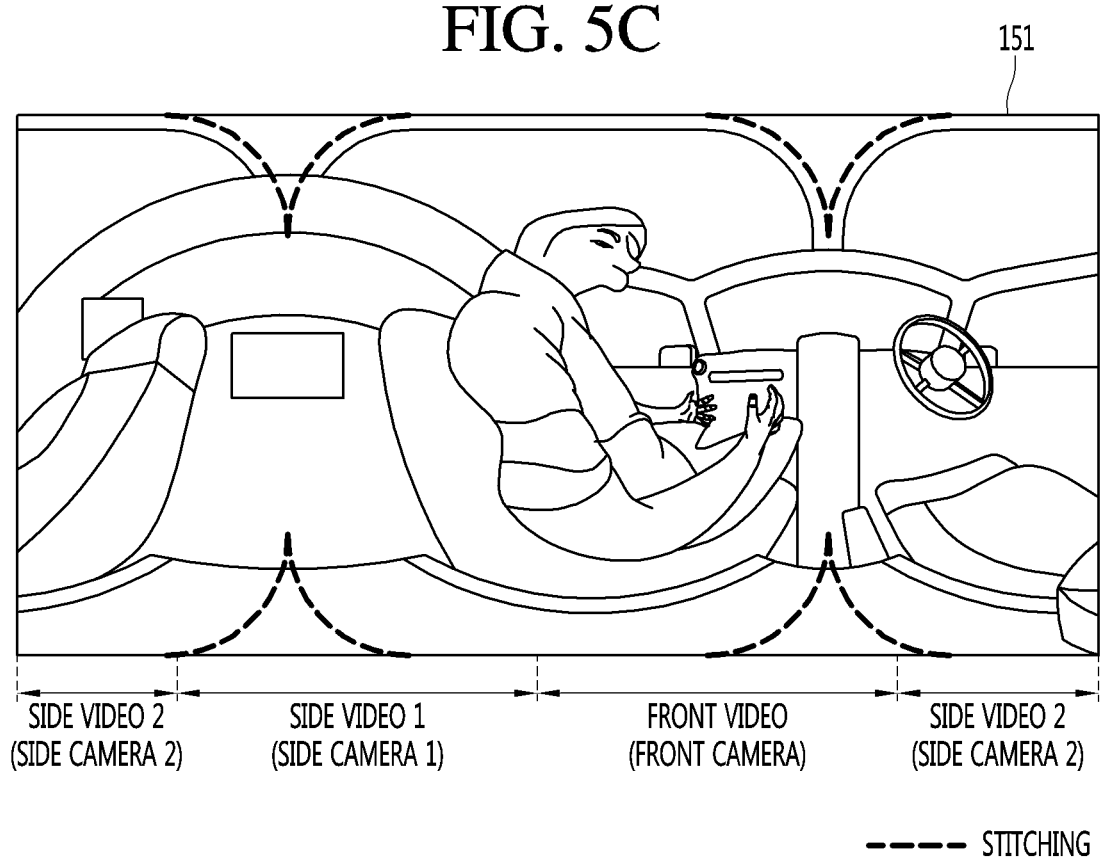

FIGS. 5A to 5C are diagrams illustrating a method of producing a 360-degree video by performing a stitching operation.

FIG. 5A illustrates a case where the 360-degree video is produced by stitching videos. The 360-degree video is a video having a view angle of 360°. The 360-degree video may be produced by capturing videos in an omni-direction of 360° by using a plurality of cameras having a certain view angle or turning a 360-degree camera having a certain view angle by an angle of 360°. The view angle means a horizontal and vertical view angle in which a camera is capable of capturing a video through a lens. When videos are concurrently captured by using a plurality of cameras at the same time point, a video or an image may be captured to have a wider view angle compared to a case where one camera is provided. According to the present disclosure, a camera capturing and/or generating a 360-degree video is defined as the 360-degree camera. The 360-degree camera may include a plurality of cameras.

Videos captured by the 360-degree camera are generated into one 360-degree video through a stitching operation. The stitching operation is an operation of reducing a distortion generated in a process of connecting a plurality of videos in a spherical shape. The stitching operation determines quality of the 360-degree video, and a production period of the 360-degree video is mostly spent to perform the stitching operation.

When the stitching operation is not properly performed, user immersion is lowered due to visible blade scars when a user views the 360-degree video in an omni-direction. When an overlap portion of videos is not removed from a connection position of the videos, a distorted portion is visible to the user as it is. As a result, quality of the 360-degree video is lowered.

The stitching operation is performed through four main processes. First, before the stitching operation is performed, videos captured by the 360-degree camera are connected and attached on a 180-degree screen. In this case, videos of the 360-degree video spread on the 180-degree screen form one image.

The image is called in a stitching program and is automatically placed in a 360-degree space. After that, the user discovers and corrects distorted portions such as an illumination, a color, and a shape one by one while viewing a left side, a right side, an upper side, and a lower side of the image.

As described above, an operation of producing the 360-degree video is completed when a subtitle, a motion, and a computer graphic (CG) are mixed into the 360-degree.

As shown in FIG. 5A, a sphere 520 is formed by connecting screens 510 obtained by spreading a sphere. The 360-degree video may be formed by stitching a plurality of captured videos in the same manner described above. The plurality of captured videos may generally have a rectangular shape. Therefore, in order to form a shape of the screens 510 obtained by spreading the sphere by connecting the plurality of captured videos to one another, it is necessary to cut off an overlap portion and correct a distorted portion in a connection region.

FIG. 5B illustrates a case where two videos are stitched and FIG. 5C is a diagram illustrating a case where three videos are stitched. The 360-degree camera may be mounted with at least two cameras. In this case, the fewer the number of cameras included in the 360-degree camera, the more a distortion is generated in a video. On the contrary, the more the number of the cameras included in the 360-degree camera, the fewer the distortion is generated and the more a stitching operation is performed. However, in this case, since a distortion of a video is reduced, a stitching operation of the video becomes easier.

When the 360-degree video is captured by using a 360-degree camera including six cameras, it is necessary to reduce a distortion by performing a stitching operation of connecting six videos captured by the six cameras. When the 360-degree video is captured by using a 360-degree camera including twelve cameras, a stitching amount is further increased.

When videos in an omni-direction of 360° are captured by a 360-degree camera including a front camera and a back camera respectively mounted on a front surface and a back surface thereof, as shown in FIG. 5B, a 360-degree video having a spherical shape is produced by stitching a front video captured by the front camera and a back video captured by the back camera. In this case, a connection portion of the front video and the back video becomes a stitching region. The front camera is a high resolution camera and the back camera is a low resolution camera. Therefore, the front video becomes a high resolution video and the back video becomes a low resolution video.

When videos in an omni-direction of 360° are captured by a 360-degree camera including a front camera, a side (back) camera 1, and a side camera 2 respectively mounted on a front surface, a first side surface (back surface), and a second side surface thereof, as shown in FIG. 5C, a 360-degree video having a spherical shape is produced by stitching a front video captured by the front camera, a side (back) video 1 captured by the side (back) camera 1, and a side video 2 captured by the side camera 2. In this case, a connection portion of at least two of the front video, the side (back) video 1, and the side video 2 becomes a stitching region.

FIGS. 6A to 6D are diagrams illustrating issues in a case where a 360-degree video is produced by performing a stitching operation.

FIG. 6A illustrates a 360-degree video 600 produced through the stitching operation. A distortion may be generated in a stitching region 610 in which different videos are connected. Specifically, a distortion phenomenon such as discoloration or a dislocation of an image may be generated in the stitching region 610. Referring to FIG. 6A, a distortion such as a dislocation of a shape in a photographing object may be generated in the stitching region 610 of the 360-degree video 600.

FIG. 6B illustrates an overlap region when videos in an omni-direction of 360° are captured by using two cameras. A 360-degree video may be produced by connecting a front video captured by a front camera and a back video captured by a back camera. In this case, as shown in FIG. 6B, an overlap region is generated at a portion at which the front video and the back video are connected. When a 360-degree video is produced through a method of connecting videos, a stitching region is always generated. Therefore, there inevitably exists a stitching issue.

The front camera and the back camera may differ in resolution or picture quality. Accordingly, when the front video and the back video are connected, a phenomenon, in which colors or objects do not perfectly match each other, may be generated. In addition, a connection portion may be dislocated or distorted in a process of removing the overlap region.

As described above, the stitching issue is inevitable in the 360-degree video. Nevertheless, a stitching operation needs to be performed by at least avoiding a focused object or a focused human. Therefore, there is a need for a guide for photographing the focused object or the focused human by avoiding a section in which stitching is generated.

Figure 6C:
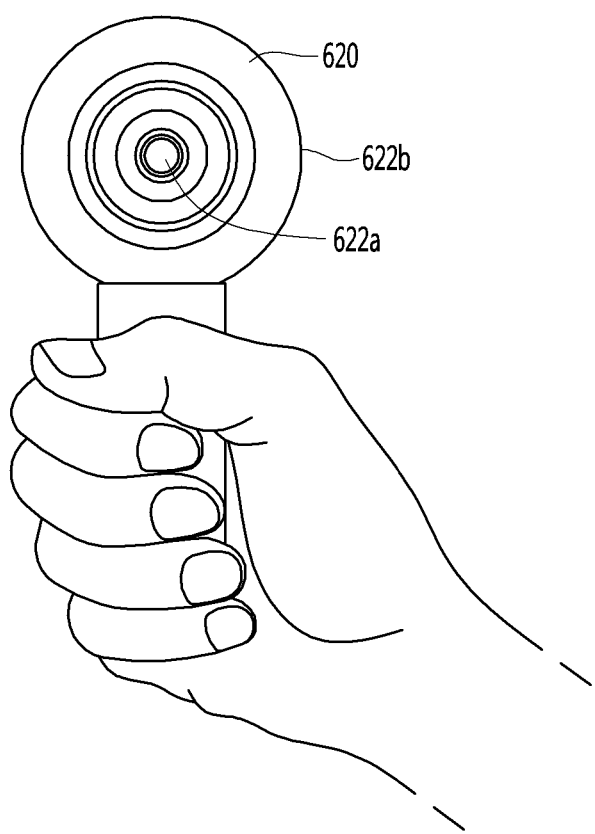

FIG. 6C illustrates an example in which a user uses a 360-degree camera 620. A plurality of cameras 622a and 622b mounted on the 360-degree camera 620 may have different physical properties. For example, the plurality of cameras 622a and 622b may differ in physical properties such as resolution and picture quality. In this case, when the plurality of cameras 622a and 622b are mounted in the same form, it is difficult for the user to distinguish the plurality of cameras 622a and 622b.

As shown in FIG. 6C, the 360-degree camera 620 includes a front camera 622a having high resolution and a back camera 622b having low resolution. However, since the 360-degree camera 620 has a spherical shape and the front camera 622a and the back camera 622b are respectively mounted on a front surface and a back surface, it is difficult for the user to know whether any surface is the front surface at the time of photographing. Therefore, the user may not photograph a certain region in an omni-direction of 360° by using a camera having desired resolution.

Figure 6D:
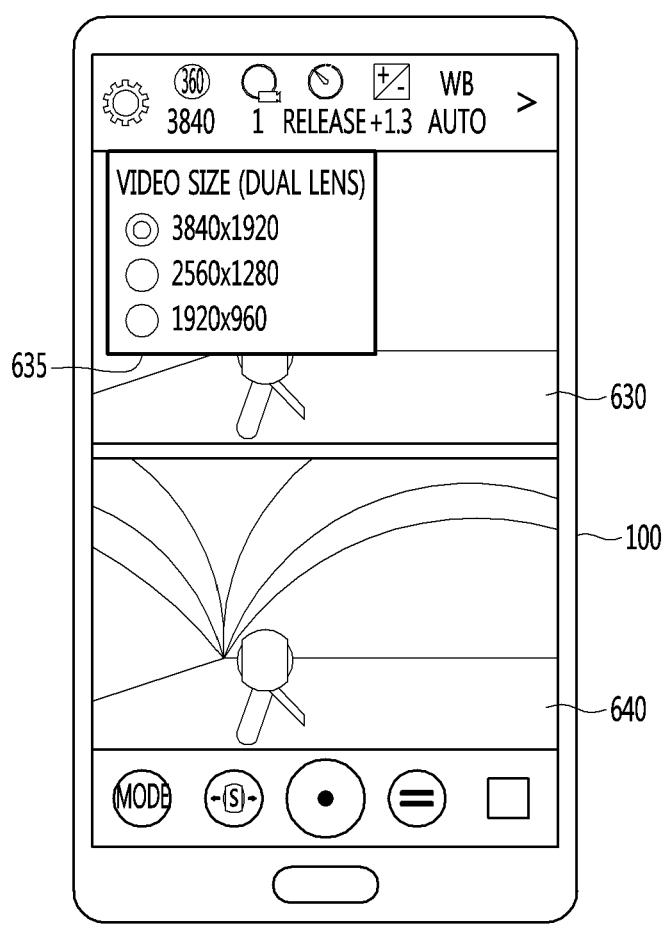

FIG. 6D illustrates an example in which the user uses a mobile terminal 100 equipped with a 360-degree camera. Resolution of the 360-degree camera may be changed according to user's setting. Specifically, a front camera and a back camera constituting the 360-degree camera may be respectively disposed on a front surface and a back surface of the mobile terminal 100, and the user may set resolution of each of the front camera and the back camera to high resolution or low resolution. Referring to FIG. 6D, a menu window 635 for setting resolution of the front camera is displayed on a screen of the mobile terminal 100 together with a front video 630 captured by the front camera and a back video 640 captured by the back camera. Accordingly, the user may easily determine whether any camera of the front camera and the back camera has high resolution or low resolution.

However, in the case of FIG. 6D, a stitching issue is generated in a process of producing a 360-degree video by connecting two videos captured by the front camera and the back camera. Specifically, the user may not previously know a position of a stitching region at the time of photographing. Therefore, when a focused subject or a focused object is placed in the stitching region, a case where the focused subject or the focused object is distorted and displayed in the produced 360-degree video is generated. Such an issue is generated in FIG. 6C in the same manner.

In addition, in this case, the focused object or the focused human may be photographed at low resolution. Therefore, when a focused photographing object is photographed, there is a need for a guide for a high resolution photographing surface such that the focused photographing object is photographed by avoiding a low resolution camera.

FIGS. 7A to 7D are diagrams illustrating an example in which a mobile terminal 100 according to an embodiment of the present disclosure provides a guide for a stitching region.

According to the present embodiment, the mobile terminal 100 may guide the stitching region. Specifically, when a user captures a 360-degree video, the mobile terminal 100 may display the stitching region on the 360-degree video.

The stitching region may be a region in which a plurality of videos included in the 360-degree video are connected to one another. Specifically, when a front video and a back video are captured by using a 360-degree camera, the stitching region may be a boundary region in which the front video and the back video are connected. When a front video, a back video, and a side video are captured by using the 360-degree camera, the stitching region may be a boundary region in which at least two of the front video, the back video, and the side video are connected.

Figure 7A:
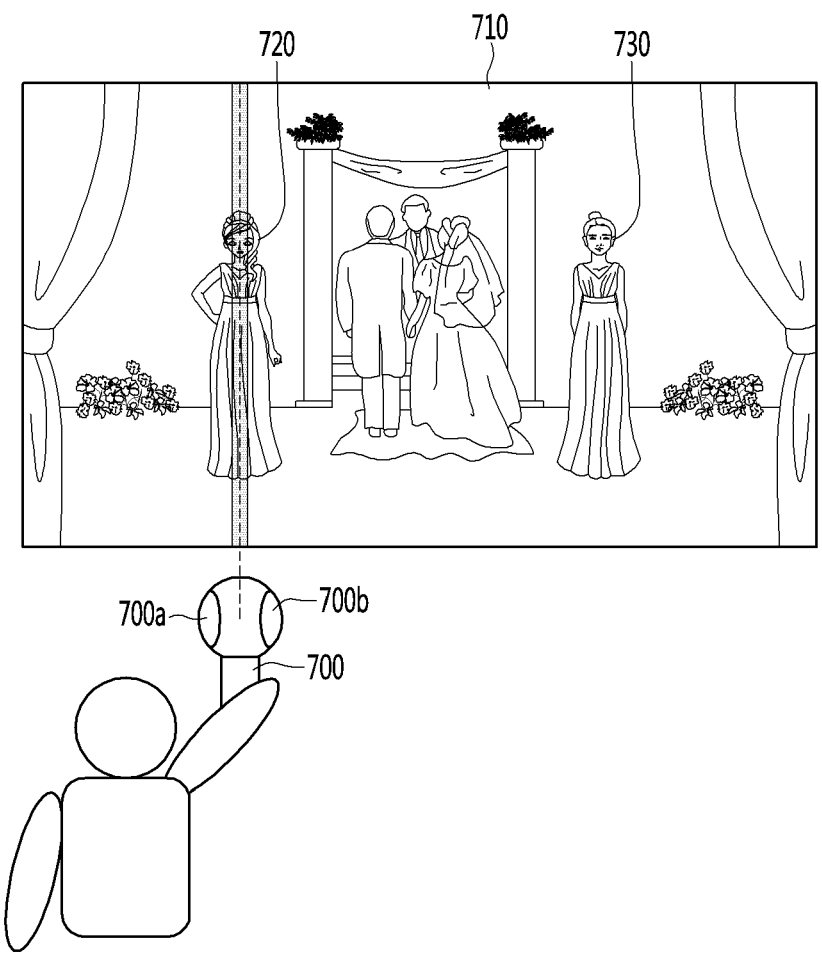
FIGS. 7A to 7D are diagrams illustrating an example in which a mobile terminal according to an embodiment of the present disclosure provides a guide for a stitching region.

FIG. 7A illustrates a case where the user captures a 360-degree video. Currently, the user is to capture a play scene 710 as the 360-degree video by using a 360-degree camera 700. A main character 720 and an extra 730 appear in the play scene 710 and a focused photographing object is the main character 720 which interests the user. The 360-degree camera 700 includes a front camera 700a and a back camera 700b.

In this case, since the mobile terminal 100 produces a 360-degree video by connecting two videos respectively captured by the front camera 700a and the back camera 700b, a stitching region is generated on a boundary on which the two videos are connected. However, the user capturing a video by using the 360-degree camera 700 may not know a position of the stitching region. Referring to FIG. 7A, when the play scene 710 is captured as the 360-degree video, a region, in which the focused photographing object, i.e., the main character 720 is displayed, becomes the stitching region. However, the user may not know that the region becomes the stitching region.

Figure 7B:
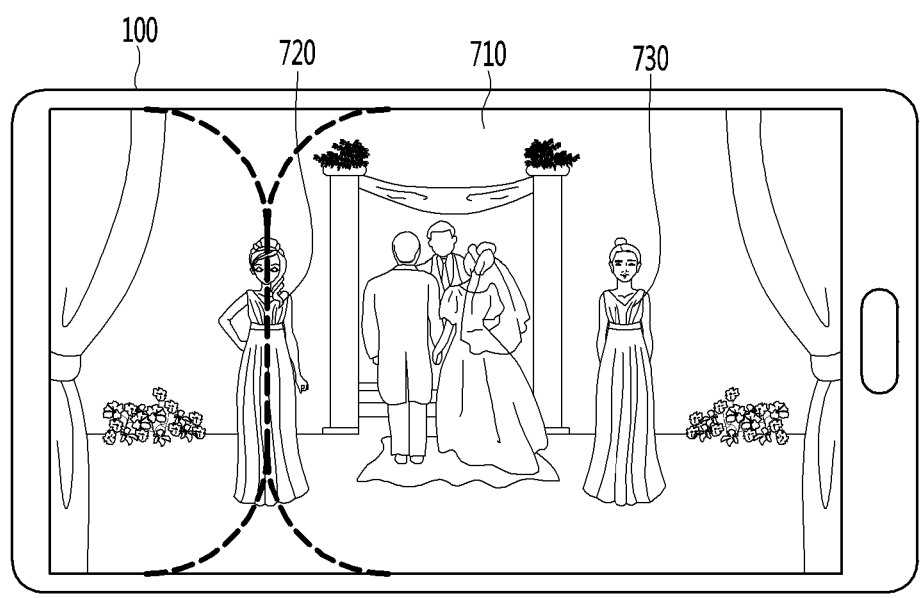

FIG. 7B illustrates a case where a stitching region is displayed. The mobile terminal 100 may display the stitching region such that the user easily recognizes the stitching region. In this case, the stitching region may be variously displayed according to embodiments. For example, the stitching region may be displayed as a bold dashed-line, shaded, or displayed in a different color from other regions so as to be discriminated from other regions. Referring to FIG. 7B, the mobile terminal 100 displays the stitching region as a bold-dashed line on the 360-degree video. As a result, the user may know that a region of the 360-degree video, in which the main character 720 is displayed, is stitched.

Figure 7C:
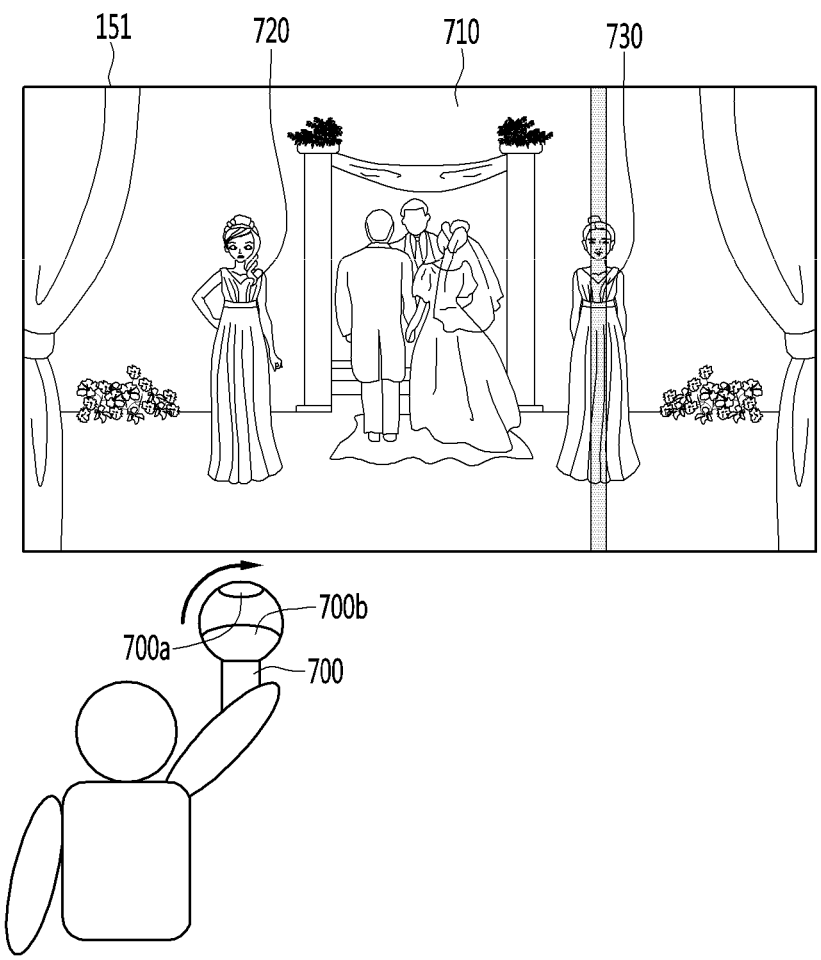

FIG. 7C illustrates a case where the user turns and grasps the 360-degree camera 700. The user may turn the 360-degree camera 700 based on a stitching region displayed on the 360-degree camera 700. The 360-degree camera 700 may be turned within an angle range of 0° and 360°. Specifically, the user may turn the 360-degree camera 700 based on the guide for the stitching region shown in FIG. 7B such that the focused photographing deviates from the stitching region. Referring to FIG. 7C, the user may turn the 360-degree camera 700 such that the front camera 700a faces the main character 720. Accordingly, the stitching region is moved from the main character 720 to the extra 730.

Figure 7D:
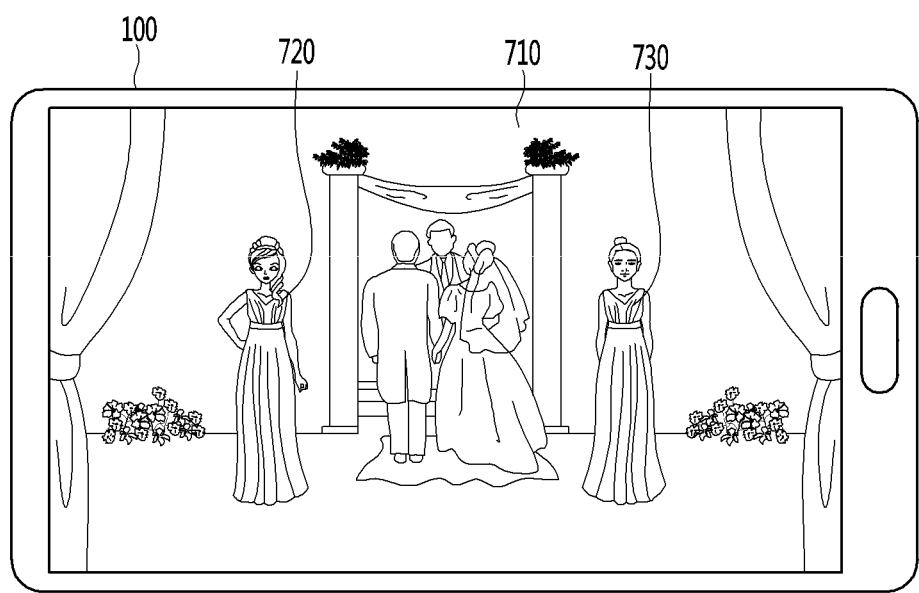

FIG. 7D illustrates a 360-degree video which is displayed on the mobile terminal 100 after the 360-degree camera 700 is turned. When it is sensed that the 360-degree camera is turned, the mobile terminal 100 may remove the stitching region displayed on the 360-degree video. Therefore, the stitching region displayed on the 360-degree video may disappear when the 360-degree camera 700 is turned.

According to the present embodiment, the mobile terminal 100 displays the stitching region on the 360-degree video captured by the 360-degree camera 700. As a result, when a focused subject is placed in the stitching region, the user may photograph the focused subject by adjusting a direction of the 360-degree camera 700 such that the focused subject is not stitched.

Figure 8A:
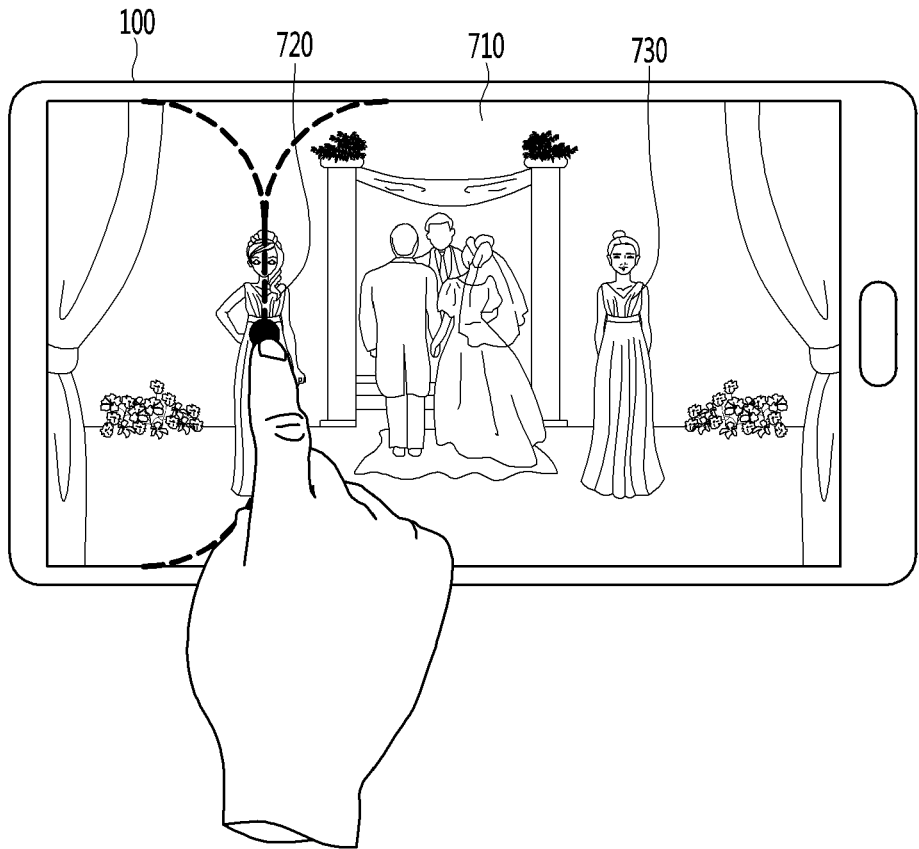
FIGS. 8A to 8C are diagrams illustrating another example in which a mobile terminal according to an embodiment of the present disclosure provides a guide for a stitching region.
Figure 8B:
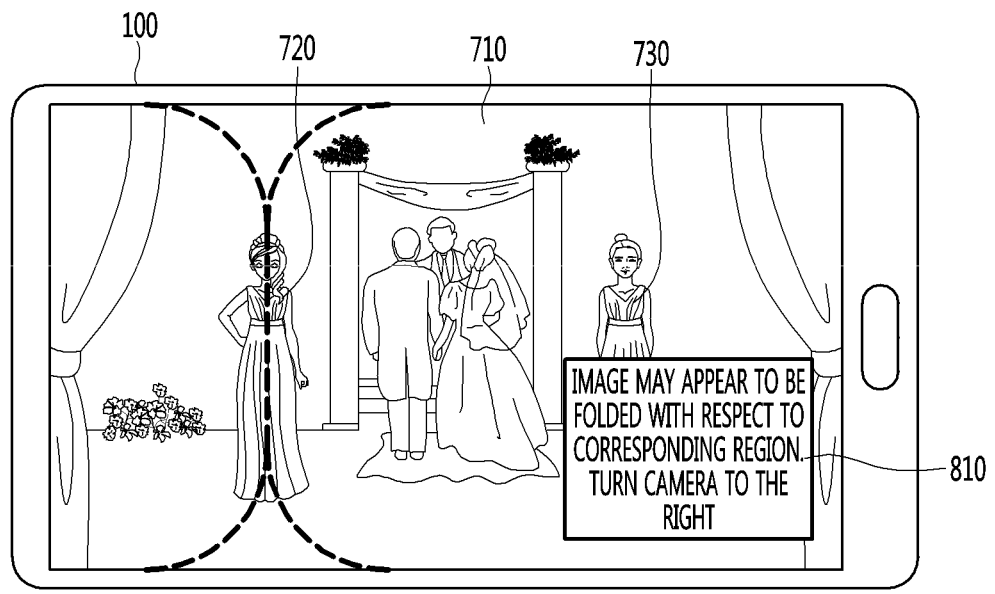
Figure 8C:
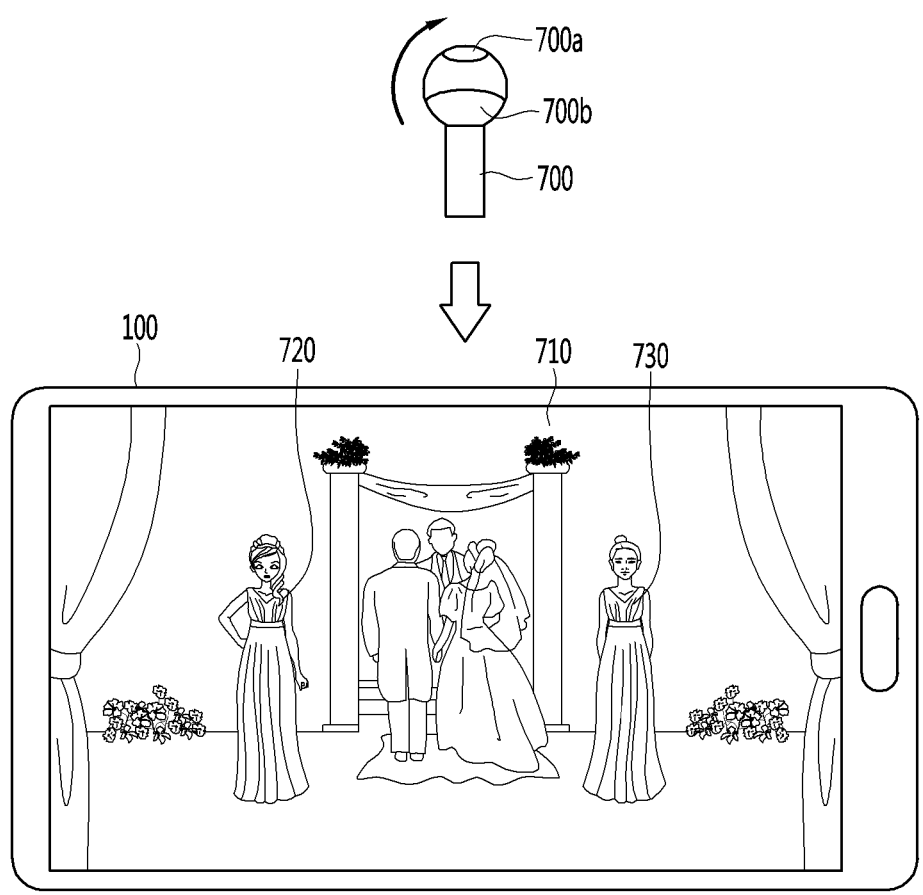

FIGS. 8A to 8C are diagrams illustrating another example in which a mobile terminal 100 according to an embodiment of the present disclosure provides a guide for a stitching region.

According to the present embodiment, the mobile terminal 100 may provide a photographing guide for avoiding the stitching region. Specifically, when a stitching region displayed on a 360-degree video is selected, the mobile terminal 100 may provide the photographing guide for avoiding the stitching region.

FIG. 8A illustrates an operation of selecting the stitching region. The operation of selecting the stitching region may be variously set according to embodiments. For example, the operation of selecting the stitching region may be a touch operation, a pressure touch operation, a tap operation, or a dragging operation with respect to the stitching region. Referring to FIG. 8A, when an operation of tapping the stitching region displayed on the 360-degree video is input to the mobile terminal 100, the stitching region is selected.

FIG. 8B illustrates a case where the mobile terminal 100 provides a photographing guide 810. The photographing guide 810 for avoiding the stitching region may include a turning direction or a turning degree of a 360-degree camera for moving the stitching region, a position of the 360-degree camera, and the like.

The photographing guide 810 may be provided in various manners according to embodiments. For example, the photographing guide 810 may be displayed on a screen in a message form or output as a voice. Referring to FIG. 8B, the photographing guide 810 having the message form is displayed on the screen.

FIG. 8C illustrates a case where the 360-degree camera is turned. A user may turn the 360-degree camera based on a photographing guide provided by the mobile terminal 100. The 360-degree camera may be turned within an angle range of 0° and 360°.

When it is sensed that the 360-degree camera is turned, the mobile terminal 100 may stop providing the photographing guide. For example, when the mobile terminal 100 provides the photographing guide by displaying a message or outputting a voice, the mobile terminal 100 may remove the message from the screen or stop outputting the voice. Alternatively, when it is sensed that the 360-degree camera is turned, the mobile terminal 100 may remove the stitching region displayed on the 360-degree video. Therefore, the stitching region displayed on the 360-degree video may disappear from the screen when the 360-degree camera is turned.

Referring to FIG. 8C, the user may turn the 360-degree camera to the right based on the photographing guide 810 shown in FIG. 8B. As a result, the stitching region is moved from a position of a main character 720 to another position, and the stitching region and the photographing guide 810 displayed on the screen disappear from the screen.

According to the present embodiment, the mobile terminal 100 may display the stitching region on the screen and provide a guide for preventing a video region currently displaying the current stitching from being stitched. Therefore, the user may photograph a focused subject by turning the 360-degree camera such that the focused subject is not stitched.

Figure 9A:
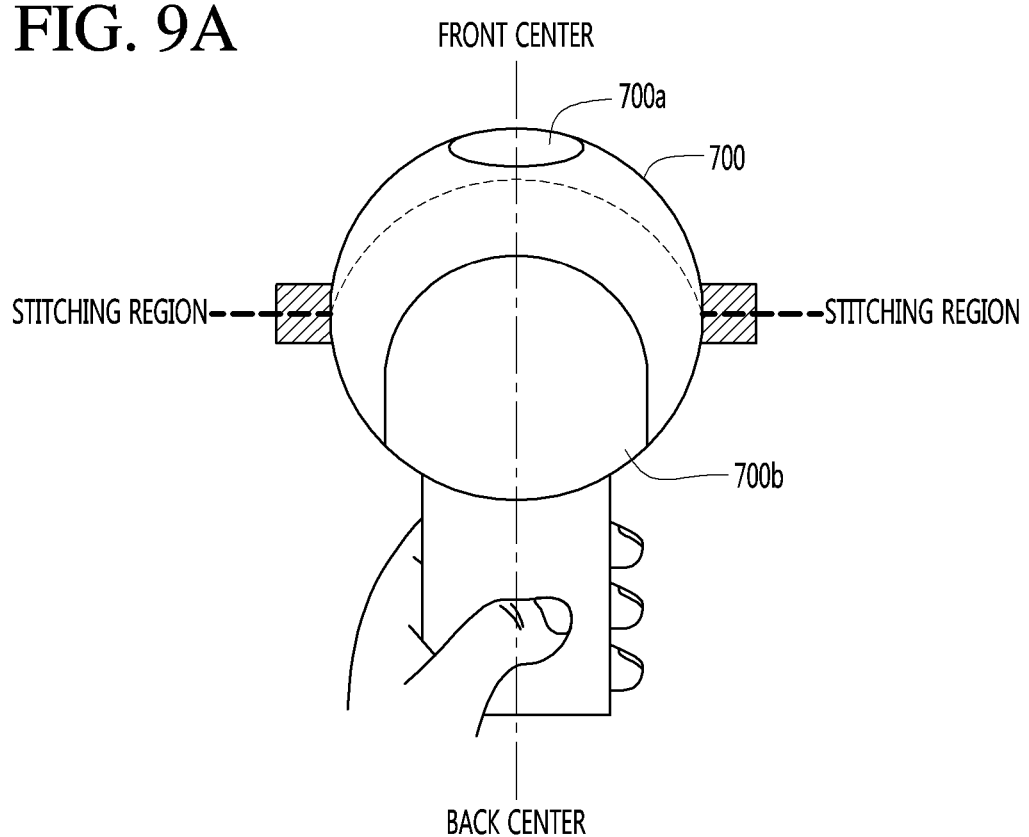
FIGS. 9A to 9C are diagrams illustrating an example in which a mobile terminal according to an embodiment of the present disclosure provides a guide for a video region photographed by a 360-degree camera.
Figure 9B:
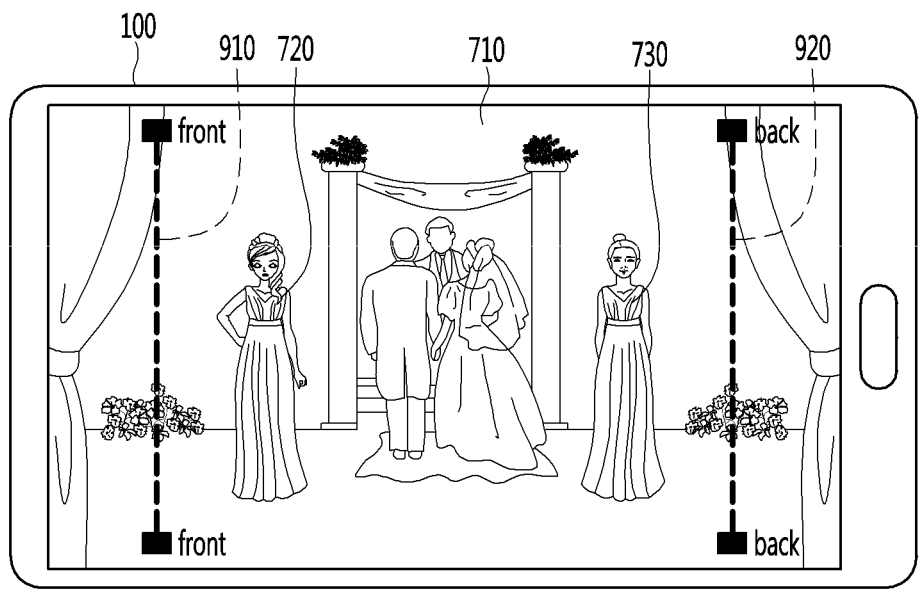
Figure 9C:
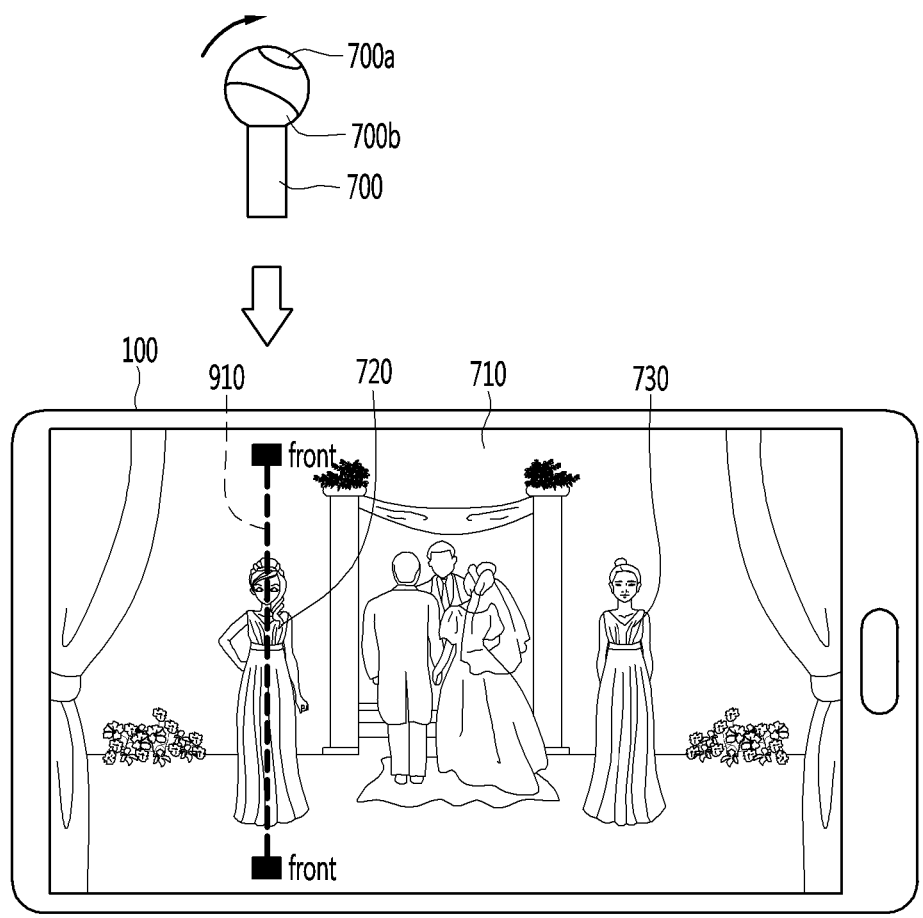

FIGS. 9A to 9C are diagrams illustrating an example in which a mobile terminal 100 according to an embodiment of the present disclosure provides a guide for a video region photographed by a 360-degree camera 700.

According to the present embodiment, the mobile terminal 100 may provide the guide for the video region photographed by the 360-degree camera 700. Specifically, the mobile terminal 100 may display a video region photographed by each of a plurality of cameras included in the 360-degree camera 700 on a 360-degree video. The plurality of cameras may differ in at least one of resolution, a position, picture quality, and a function.

FIG. 9A illustrates a video region photographed by the 360-degree camera 700. The 360-degree camera 700 may be mounted with a plurality of cameras. For example, as shown in FIG. 9A, the 360-degree camera 700 may include a front camera 700a and a back camera 700b. However, the present disclosure is not limited thereto, and the number of cameras mounted on the 360-degree camera 700 may be variously set according to embodiments.

In the case of FIG. 9A, a front video is captured by the front camera 700a and a back video is captured by the back camera 700b. In this case, a front center is a center of a view angle acquired by the front camera 700a. A back center is a center of a view angle acquired by the back camera 700b. The front center and the back center are the farthest points from a stitching region and a distortion is the least frequent in the front center and the back center.

A stitching section is present in a region in which the front video and the back video respectively captured by the front camera 700a and the back camera 700b are connected.

Generally, the front camera 700a and the back camera 700b may differ in properties such as resolution and picture quality. However, in the case of the 360-degree camera 700 as configured in FIG. 9A, it is difficult for the user to distinguish the front camera 700a and the back camera 700b having different resolutions to the naked eye. Therefore, even in a case where a focused subject is photographed at low resolution and other objects are photographed at high resolution, the user may not recognize the case.

FIG. 9B illustrates a case where the mobile terminal 100 displays a front center 910 and a back center 920 on a 360-degree video 710. The mobile terminal 100 may display a video region photographed by each of a plurality of cameras mounted on the 360-degree camera 700 on the 360-degree video 710.

According to an embodiment, the mobile terminal 100 may display the front center 910 and the back center 920. The front center 910 and the back center 920 may become an optimal photographing point.

The mobile terminal 100 may display the front center 910 and the back center 920 in various manners according to embodiments. For example, the front center 910 and the back center 920 may be displayed as a solid line or a dashed-line, displayed by shading a corresponding portion, or displayed by indicating the corresponding portion by using an arrow.

Referring to FIG. 9B, the mobile terminal 100 displays the front center 910 and the back center 920 as a dashed-line on the 360-degree video 710. In this case, the mobile terminal 100 may display information on a camera corresponding to each of the front center 910 and the back center 920. Referring to FIG. 9B, the front center 910 corresponds to the front camera 700a and the back center 920 corresponds to the back camera 700b. Therefore, the user may distinguish a region photographed by the front camera 700a and a region photographed by the back camera 700b.

FIG. 9C illustrates a case where the 360-degree camera 700 is turned. The user may photograph a certain region by using a camera having desired resolution based on video regions respectively photographed by a plurality of cameras and displayed on a 360-degree video. To this end, the user may turn the 360-degree camera 700. The 360-degree camera 700 may be turned within an angle range of 0° and 360°.

Referring to FIG. 9C, the user wants to photograph a focused photographing object, i.e., a main character 720 at high resolution. In this case, the user turns the 360-degree camera 700 to the right such that the front center 910 shown in FIG. 9B matches the main character 720. As the 360-degree camera 700 is turned, the front center 910 displayed on the 360-degree video may be moved in response to the turning of the 360-degree camera 700. As a result, the front center 910 of the front camera 700a matches the main character 720.

Meanwhile, the description assumes only a case where two cameras, i.e., the front camera 700a and the back camera 700b are mounted on the 360-degree camera 700 in FIGS. 9A to 9C, but the present disclosure is not limited thereto. The 360-degree camera 700 may be mounted with a plurality of transformable cameras according to embodiments. In response to this, centers of the plurality of transformable cameras may be present in plural.

According to the present embodiment, the mobile terminal 100 displays a guide for a center of each of cameras mounted on a 360-degree camera and guides for a user to capture a 360-degree video in accordance with the center. The user may photograph a focused photographing object by using a camera having desired resolution by turning the 360-degree camera with reference to the guide.

FIGS. 10A to 10D are diagrams illustrating an example in which a mobile terminal 100 according to an embodiment of the present disclosure provides a photographing guide such that stitching is performed by avoiding an object.

According to the present embodiment, the mobile terminal 100 may provide the photographing guide for capturing a 360-degree video such that the object is not stitched. Specifically, the mobile terminal 100 may provide the photographing guide of the 360-degree video, which allows a stitching region to avoid a focused photographing object. In this case, a user may designate a region or an object, which is not to be stitched, as the focused photographing region, and capture the 360-degree video so as not to be stitched based on the photographing guide.

Figure 10A:
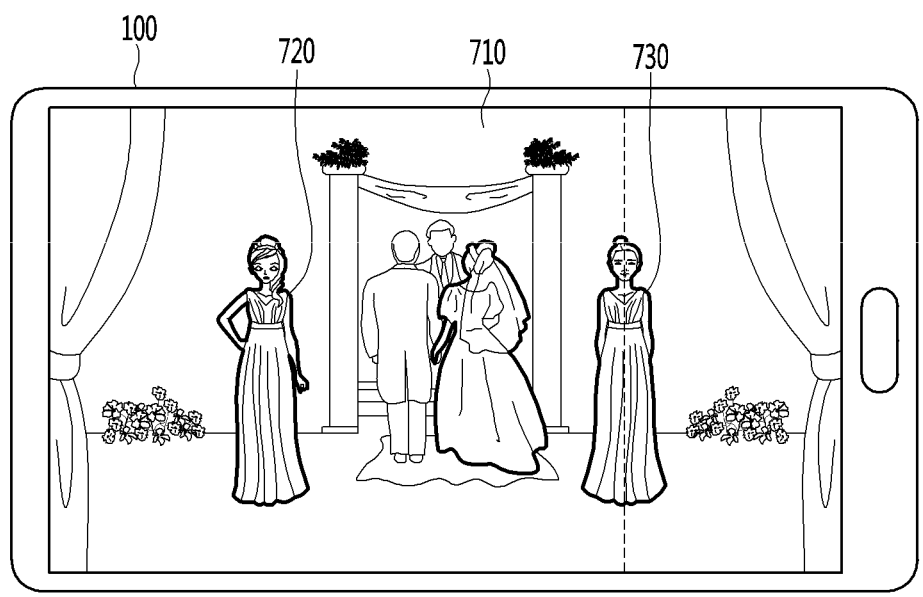
FIGS. 10A to 10D are diagrams illustrating an example in which a mobile terminal according to an embodiment of the present disclosure provides a photographing guide such that stitching is performed by avoiding an object.

FIG. 10A illustrates a case where the mobile terminal 100 recognizes an object included in the 360-degree video. The mobile terminal 100 may recognize a plurality of objects included in the 360-degree video. The plurality of objects may include a human, a thing, a place, and the like.

An object recognizing method may be variously set according to embodiments. For example, the mobile terminal 100 may recognize an object based on various video analysis methods such as an outline sampling method and a video recognition method. The mobile terminal 100 may display the recognized object on the 360-degree video. Specifically, the mobile terminal 100 may clearly display the recognized object, clearly display an outline of the recognized object thereof, or shade the recognized object so as to be discriminated from other video elements.

Referring to FIG. 10A, the mobile terminal 100 may display recognized focused humans in bold.

Figure 10B:
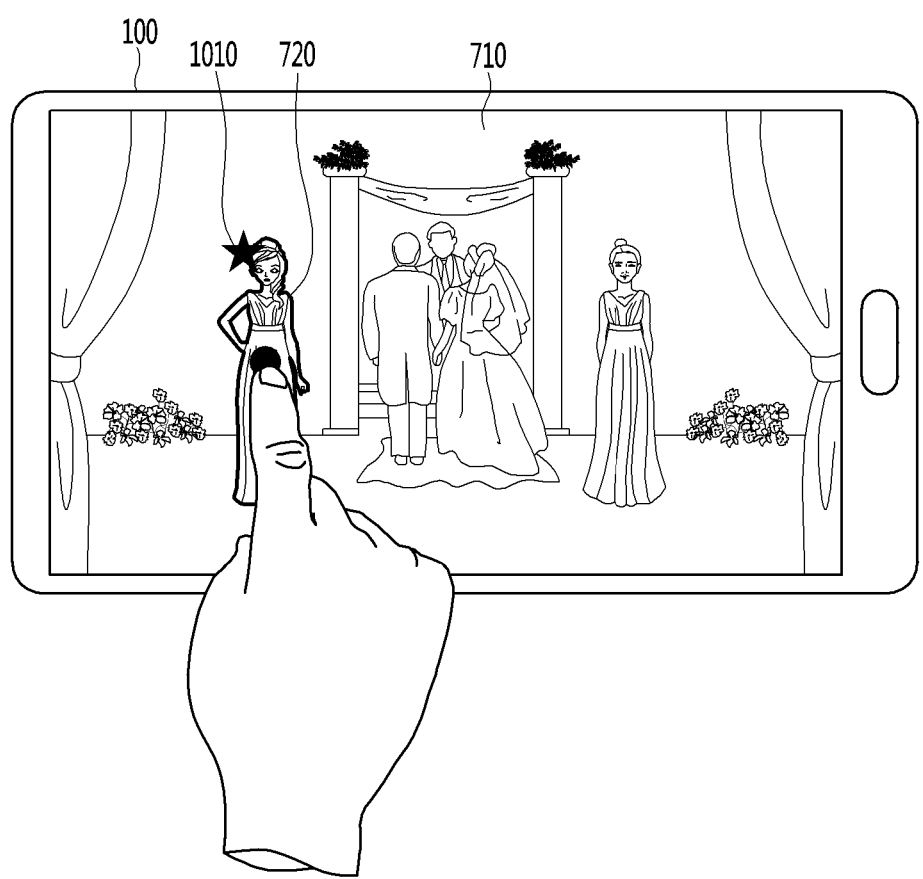

FIG. 10B illustrates a case where a recognized object is set as a focused photographing object. The recognized object may be set as the focused photographing object. Specifically, when an input signal for selecting the recognized object is received, the mobile terminal 100 may set a corresponding object as the focused photographing object. The input signal for selecting the recognized object may be generated by a touch operation, a long touch operation, a pressure touch operation, a short touch operation, a tap touch operation, and a dragging operation with respect to the corresponding object.

An indicator 1010 indicating the focused photographing object may be displayed on the focused photographing object. The indicator 1010 may include a tag, a bookmark, an icon, and the like.

Referring to FIG. 10B, an input signal for pressing and holding a main character 720 is received. In this case, the mobile terminal 100 sets the main character 720 as the focused photographing object and displays the indicator 1010 indicating the main character 720 at a corresponding position.

Figure 10C:
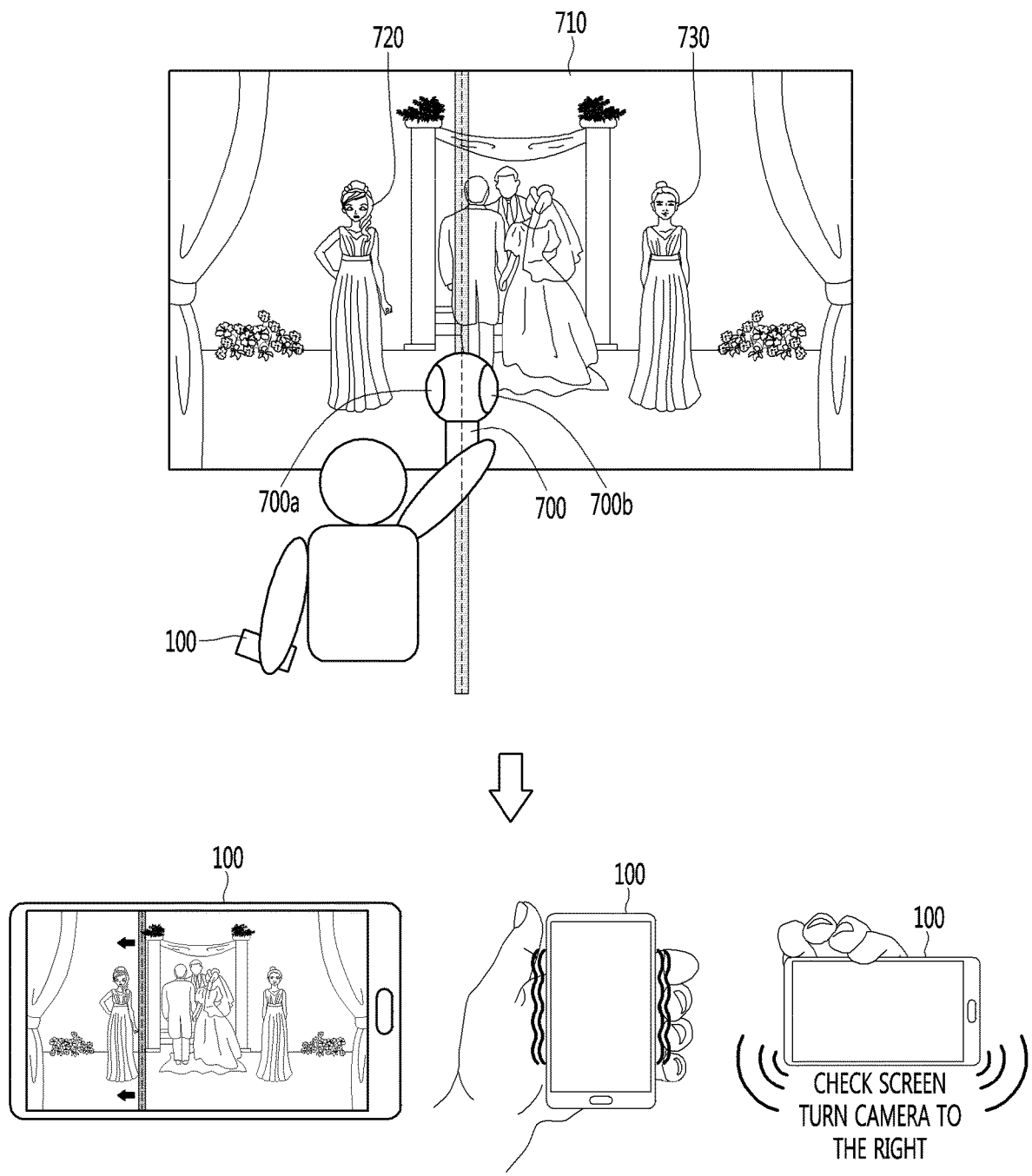

FIG. 10C illustrates a case where a user turns a 360-degree camera. The user may capture a 360-degree video while turning the 360-degree camera. In this case, as the 360-degree camera is turned, the focused photographing object may approach a stitching region.

When the focused photographing object approaches the stitching region, the mobile terminal 100 may provide notification of the approaching of the focused photographing object. Specifically, the mobile terminal 100 may provide notification of the approaching of the focused photographing object by displaying a stitching region on the 360-degree video, generating a vibration, or outputting a voice. In this case, the user may recognize based on the notification that the focused photographing object approaches the stitching region.

Figure 10D:
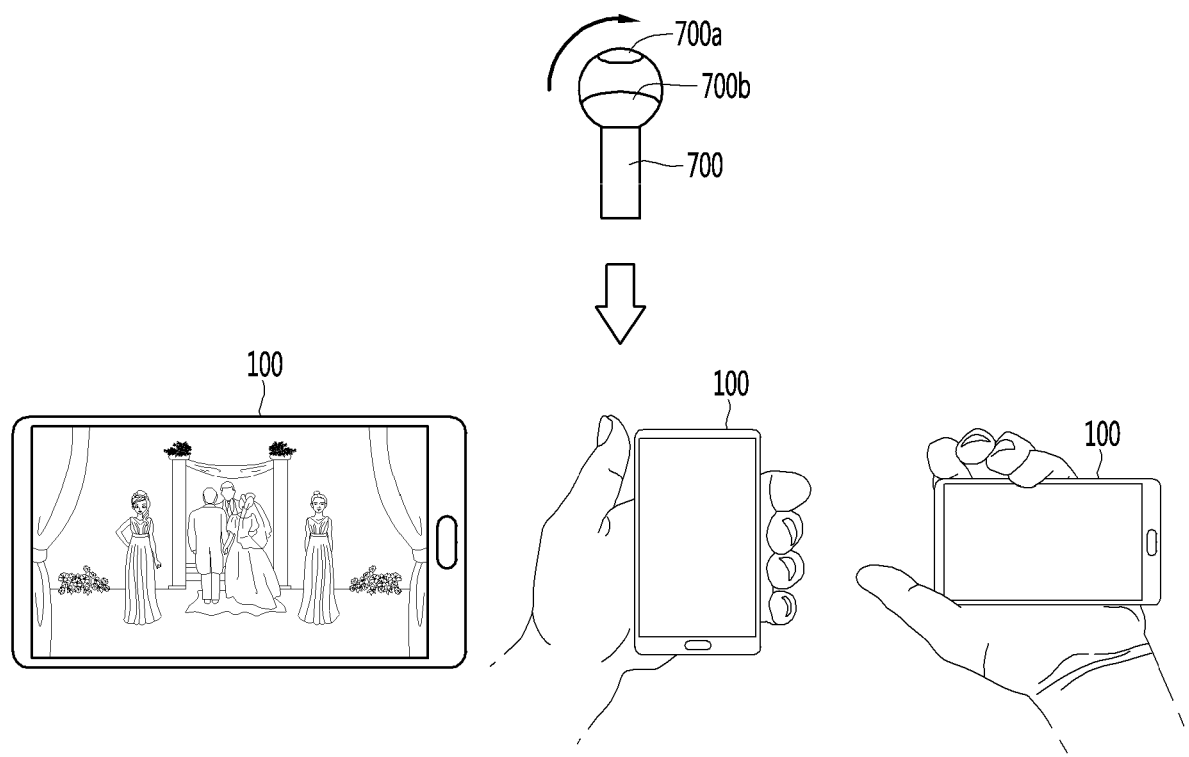

FIG. 10D illustrates a case where the user turns the 360-degree camera based on notification. The user may turn the 360-degree camera based on various notification methods provided by the mobile terminal 100 such that the focused photographing object is not placed in the stitching region. Referring to FIG. 10D, the user may turn the 360-degree camera to the right such that the focused photographing object deviates from the stitching region.

When a distance between the focused photographing object and the stitching region is increased due to the turning of the 360-degree camera, the mobile terminal 100 may stop the notification. Specifically, the mobile terminal 100 may not display the stitching region on the 360-degree video or may stop generating the vibration or outputting the voice. In this case, the user may recognize based on the stopping of the notification that the focused photographing object deviates from the stitching region.

According to the present embodiment, the user may set a desired object as the focused photographing object and capture the 360-degree video based on the notification provided by the mobile terminal 100 such that the focused photographing object is not placed in the stitching region.

Figure 11A:
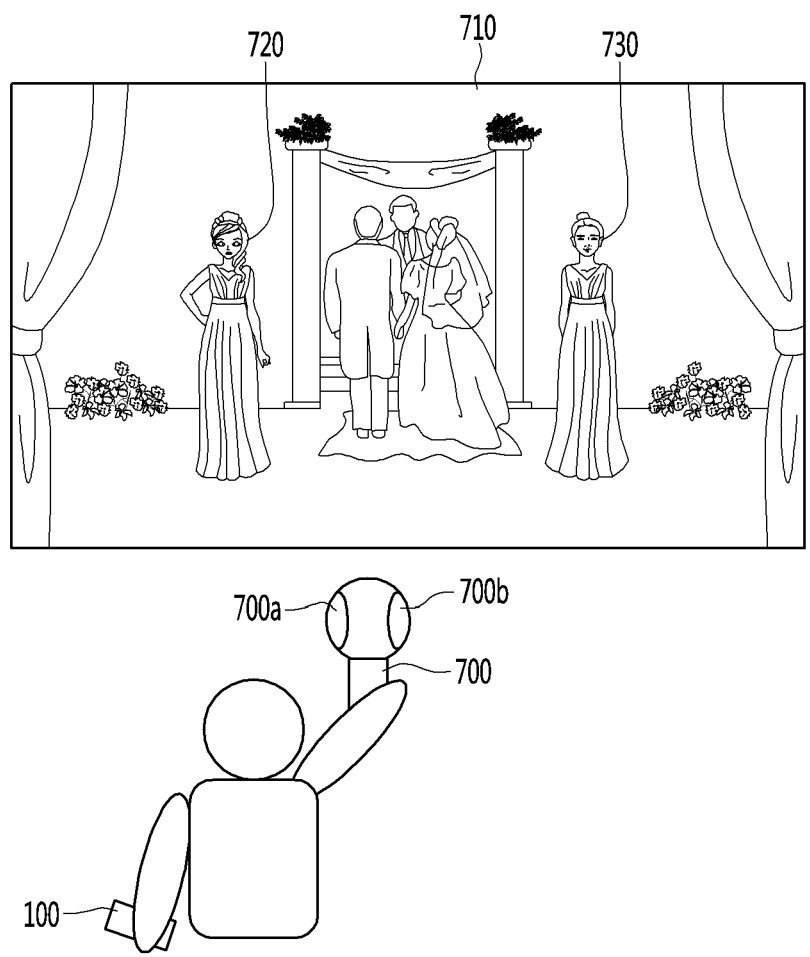
FIGS. 11A to 11C are diagrams illustrating an example in which a mobile terminal according to an embodiment of the present disclosure provides a guide for resolution of a video region photographed by a 360-degree camera.
Figure 11B:
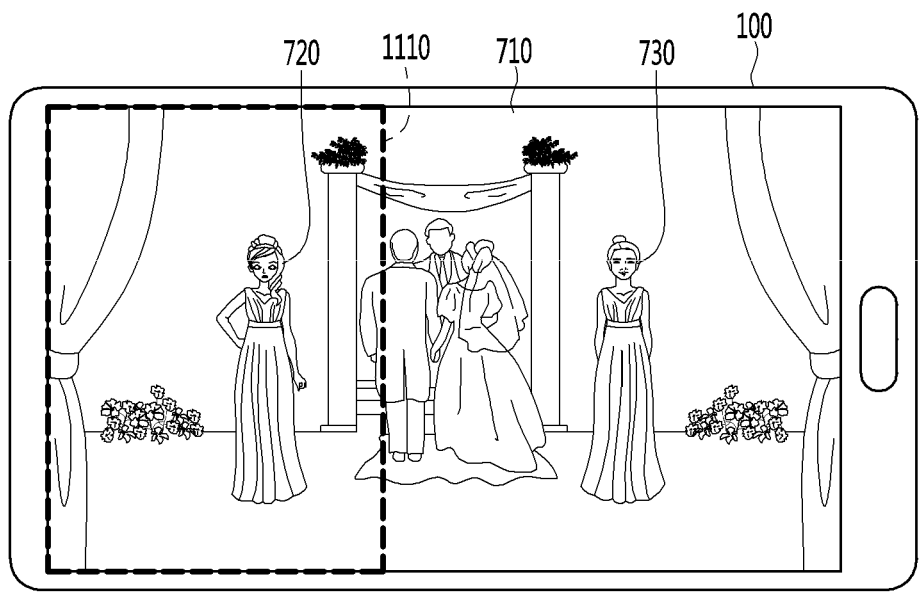
Figure 11C:
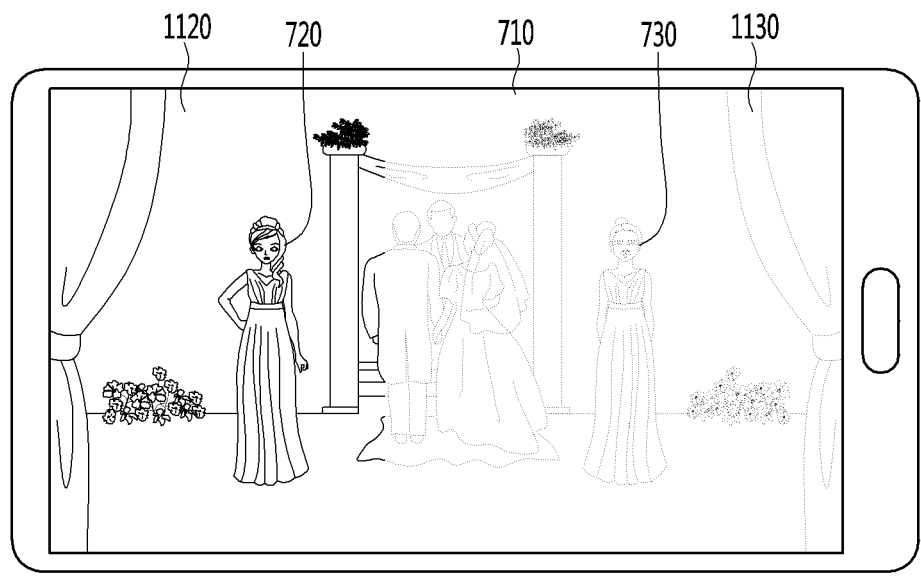

FIGS. 11A to 11C are diagrams illustrating an example in which a mobile terminal 100 according to an embodiment of the present disclosure provides a guide for resolution of a video region photographed by a 360-degree camera 700.

According to an embodiment of the present disclosure, the mobile terminal 100 may provide the guide for the resolution of the video region photographed by the 360-degree camera 700. Specifically, the mobile terminal 100 may display a video region photographed by a high resolution camera of a plurality of cameras mounted on the 360-degree camera 700.

FIG. 11A illustrates a case where a user captures a 360-degree video by using the 360-degree camera 700. The 360-degree camera 700 may include a high resolution camera 700a and a low resolution camera 700b. When the user captures the 360-degree video by using the 360-degree camera 700, a region photographed by the high resolution camera 700a becomes a high resolution region and a region photographed by the low resolution camera 700b becomes a low resolution region. Referring to FIG. 11A, a region currently including a main character 720 will be photographed by a front camera, i.e., the high resolution camera 700a and a region including an extra 730 will be photographed by a back camera, i.e., the low resolution camera 700b. However, when the high resolution camera 700a and the low resolution camera 700b are realized in shapes indistinguishable from each other, the user may not distinguish a region photographed at high resolution and a region photographed at low resolution.

FIG. 11B is a diagram illustrating an example in which a high resolution region is displayed. The mobile terminal 100 may discriminately display a high resolution region of a plurality of regions included in a 360-degree video. For example, the high resolution region may be displayed as a dashed-line region. However, the present disclosure is not limited thereto, and a method of displaying high resolution may be variously set according to embodiments. Referring to FIG. 11B, an edge of a high resolution region 1110 photographed by the high resolution camera 700a is displayed as a bold dashed-line. As a result, the user may easily know a video region photographed at high resolution in the 360-degree video.

FIG. 11C is a diagram illustrating an example in which a low resolution region is displayed. The mobile terminal 100 may discriminately display a low resolution region of the plurality of regions included in the 360-degree video. For example, the low resolution region may be faintly displayed. However, the present disclosure is not limited thereto, and a method of displaying low resolution may be variously set according to embodiments. Referring to FIG. 11C, a low resolution region 1130 photographed by the low resolution camera 700b is faintly displayed. On the contrary, a high resolution region 1120 photographed by the high resolution camera 700a is clearly displayed according to original resolution. As a result, the user may easily distinguish a video region photographed at high resolution and a video region photographed at low resolution in the 360-degree video.

As described above, according to the present disclosure, the user is guided to adjust a direction of the 360-degree camera capturing the 360-degree video by providing a guide for whether a high resolution region is a region photographed at high resolution.

Figure 12A:
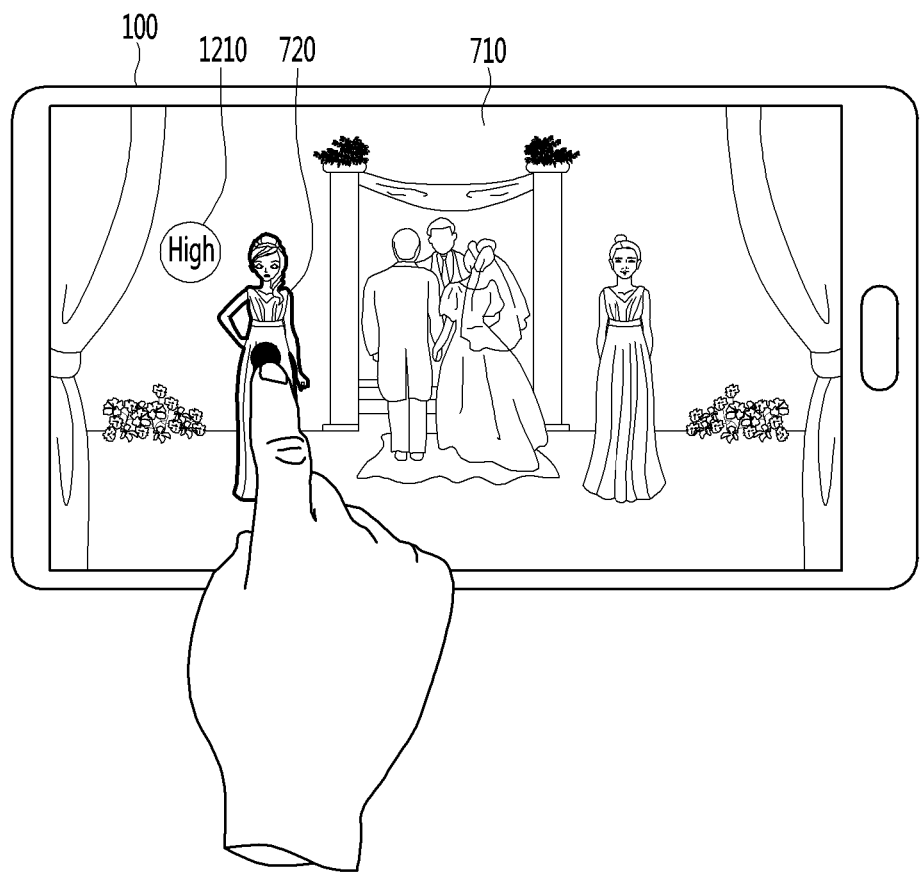
Figure 12B:
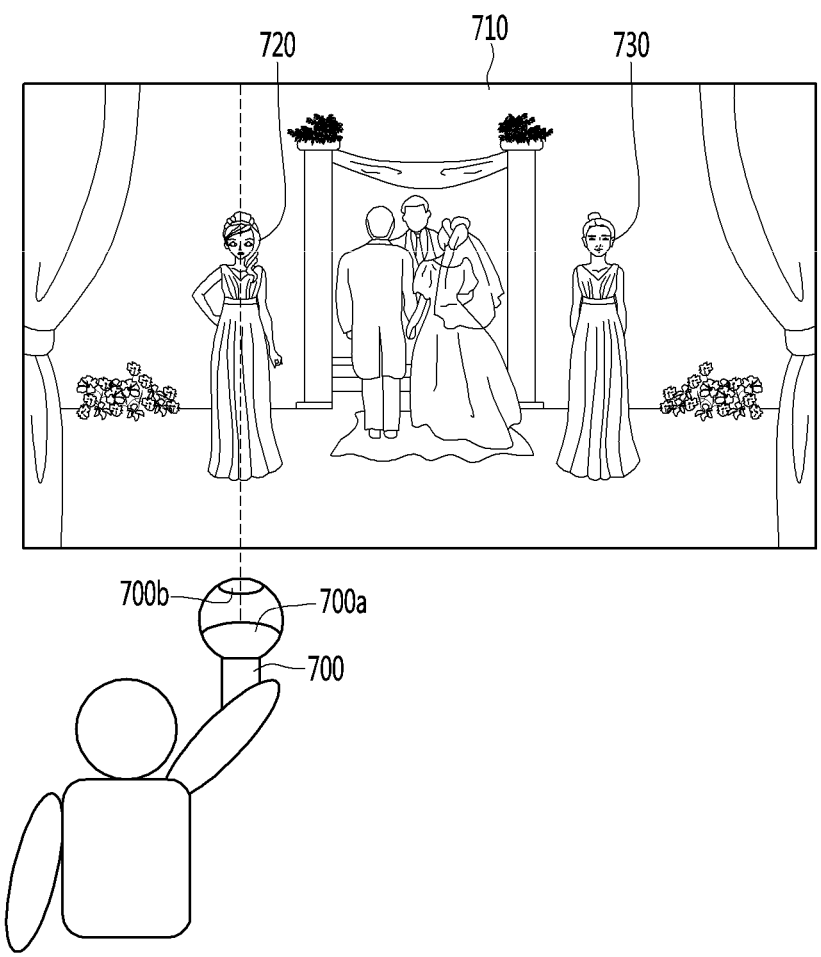

FIGS. 12A to 12C are diagrams illustrating an example in which a mobile terminal 100 according to an embodiment of the present disclosure provides a photographing guide such that a focused object is photographed at high resolution According to the present embodiment, when a 360-degree video is captured, the mobile terminal 100 may provide a guide such that a focused photographing object is photographed at high resolution. In this case, a user may designate an object to be photographed at high resolution as the focused photographing object and capture the 360-degree video such that the focused photographing object is photographed at high resolution based on the guide.

FIG. 12A illustrates a case where a focused photographing object is set. The mobile terminal 100 may set the focused photographing object. Specifically, when an input signal for selecting a certain object is received, the mobile terminal 100 may set a corresponding object as the focused photographing object. The input signal for selecting the certain object may be generated by a touch operation, a long touch operation, a pressure touch operation, a short touch operation, a tap touch operation, and a dragging operation with respect to the corresponding object.

An indicator 1210 indicating the focused photographing object may be displayed on the focused photographing object. The indicator 1210 may be displayed as a shape such as a tag, a bookmark, or an icon.

Referring to FIG. 12A, an input signal for pressing and holding a main character 720 displayed on the 360-degree video is received. In this case, the mobile terminal 100 sets the main character 720 as the focused photographing object and displays the indicator 1210 at a corresponding position, the indicator 1210 indicating that the main character 720 is photographed at high resolution.

FIG. 12B illustrates a case where the user turns a 360-degree camera. The user may capture a 360-degree video while turning the 360-degree camera. In this case, as the 360-degree camera is tuned, the focused photographing object may be photographed at low resolution. Referring to FIG. 12B, the user currently photographs the focused photographing object by using a back camera 700b having low resolution.

FIG. 12C illustrates a case where notification of photographing resolution is provided. When the focused photographing object is photographed at low resolution, the mobile terminal 100 may provide notification of the low resolution photographing. A notification providing method may be variously set. Specifically, as shown in FIG. 12C, the mobile terminal 100 may display video quality (low resolution or high resolution) or a warning sign in which the focused photographing object is currently photographed. Alternatively, the mobile terminal 100 may generate a vibration or output an alarm. Furthermore, the mobile terminal 100 may directly provide a turning guide of the 360-degree camera to the user as a voice or a message form.

In this case, the user may recognize based on the notification that the focused photographing object is photographed at low resolution. The user may turn the 360-degree camera based on various notification methods provided by the mobile terminal 100 such that the focused photographing object is photographed at high resolution.

When the focused photographing object is photographed at high resolution by turning the 360-degree camera, the mobile terminal 100 may stop providing the notification. Specifically, the mobile terminal 100 may not display an identifier providing notification of low resolution or warning on the 360-degree video or may stop generating the vibration or outputting the voice. In this case, the user may recognize based on the stopping of the notification that the focused photographing object is photographed at high resolution.

According to the present embodiment, the user may set an object to be photographed at high resolution as the focused photographing object and capture the 360-degree video based on the notification provided by the mobile terminal 100 such that the focused photographing object is photographed at high resolution.

Figure 13A:
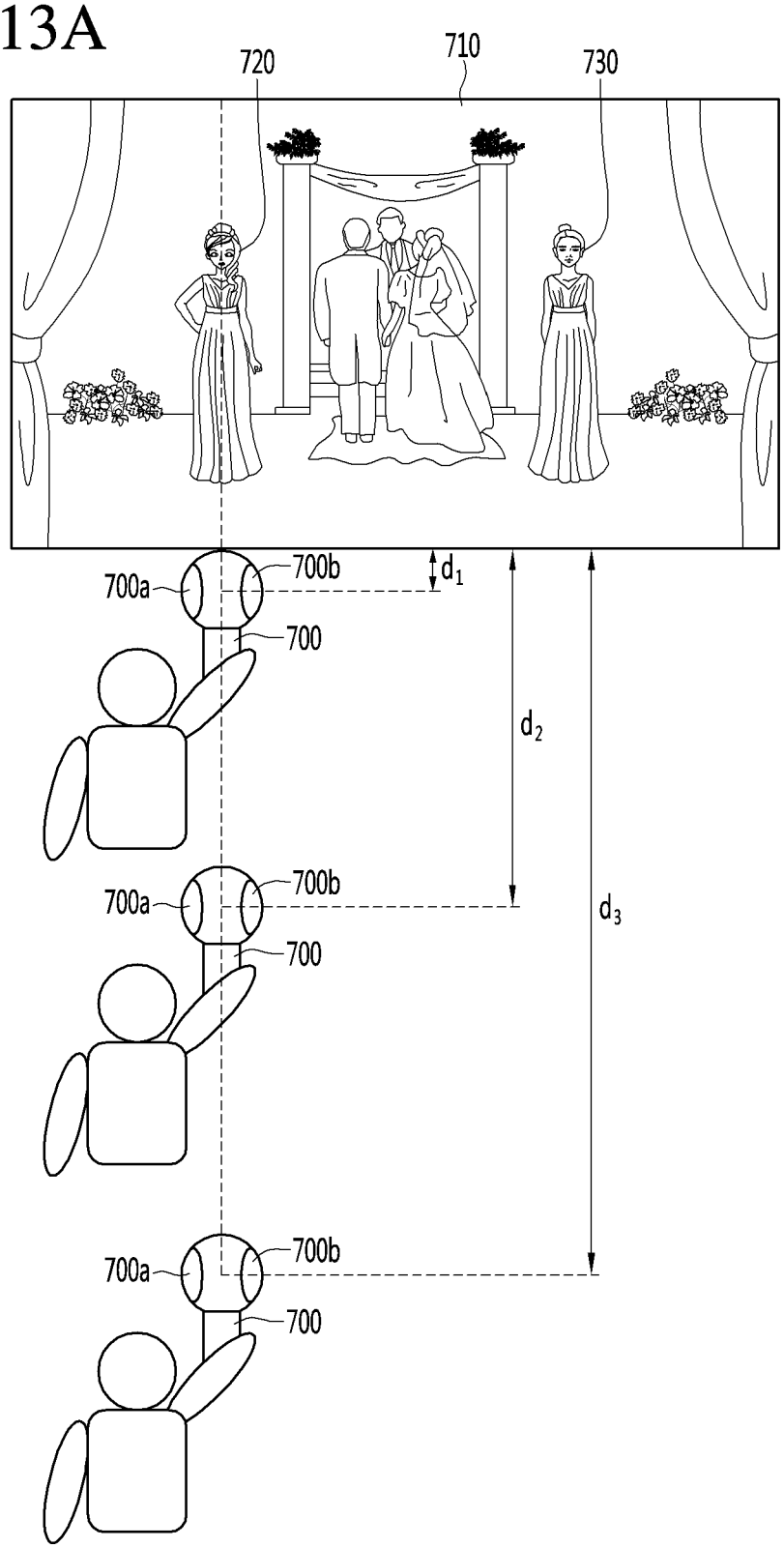

FIGS. 13A and 13B are diagrams illustrating an example in which a mobile terminal 100 according to an embodiment of the present disclosure displays a stitching region in accordance with a distance from a photographing object.

A size of the stitching region may be changed in accordance with a distance between a 360-degree camera and a photographing object. Specifically, the distance between the 360-degree camera and the photographing object is decreased, the stitching region is widened. On the contrary, as the distance between the 360-degree camera and the photographing object is increased, the stitching region becomes narrow.

In this case, the mobile terminal 100 may determine the distance between the 360-degree camera and the photographing object and change and display the stitching region based on the determination result.

FIG. 13A illustrates a case where the photographing object is photographed as a 360-degree video at different distances by using the 360-degree camera. Referring to FIG. 13A, a main character 720 of a play scene is photographed at distances d1, d2, and d3.

FIG. 13B illustrates a case where an area of the stitching region is changed in accordance with a distance from a photographing object. When the 360-degree camera approaches the photographing object or a preview screen displayed on the mobile terminal 100 is magnified, the area of the stitching region may be expanded. Referring to FIG. 13B, as the distance between the photographing object and the 360-degree camera is increased from the distance d1 to the distance d3, the area of the stitching region is gradually reduced. When the distance between the photographing object and the 360-degree camera is the distance d3, the stitching region is represented by a line.

In this case, a user may capture the 360-degree video by adjusting a direction of the 360-degree camera such that a focused photographing object is not stitched. In addition, the 360-degree video may be captured such that the focused photographing object is not stitched, by increasing the distance between the photographing object and the 360-degree camera or reducing the preview screen to reduce the stitching region.

Figure 14A:
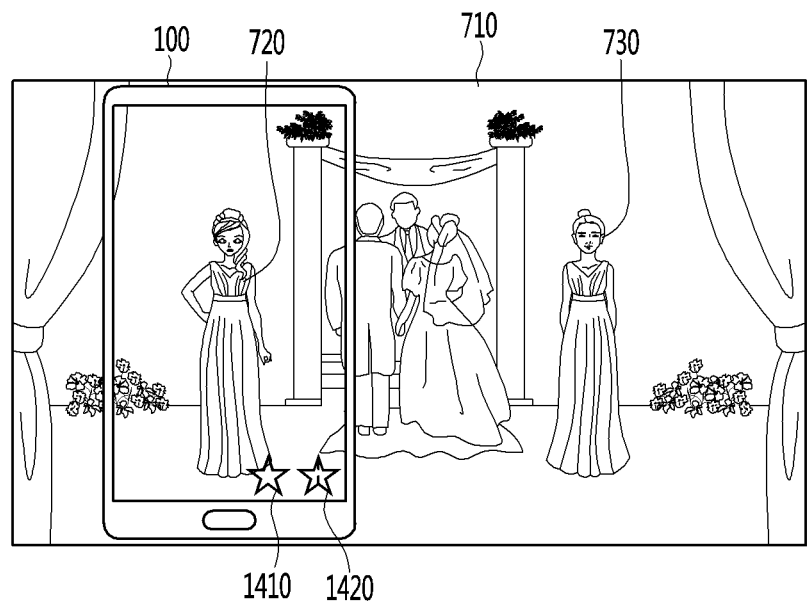
FIGS. 14A to 14C are diagrams illustrating an example in which a mobile terminal according to an embodiment of the present disclosure provides a guide for a photographing state of a focused photographing object.
Figure 14B:
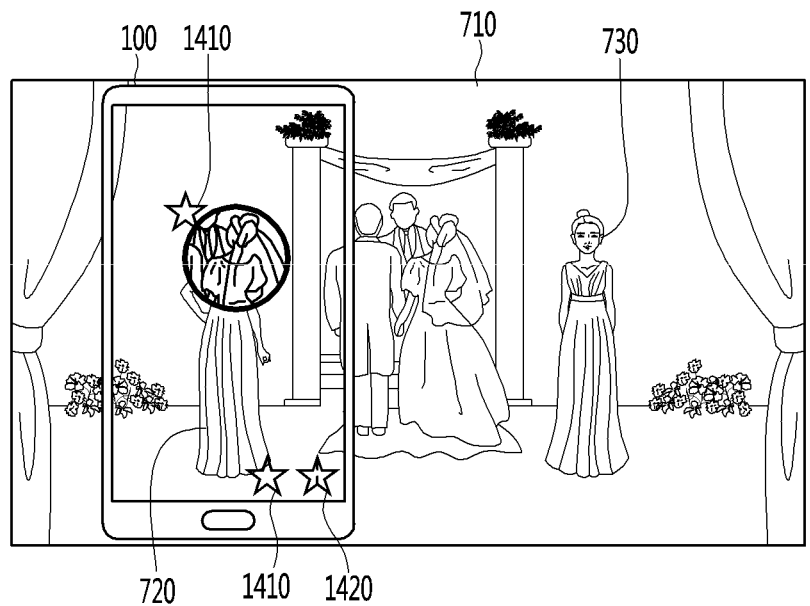
Figure 14C:
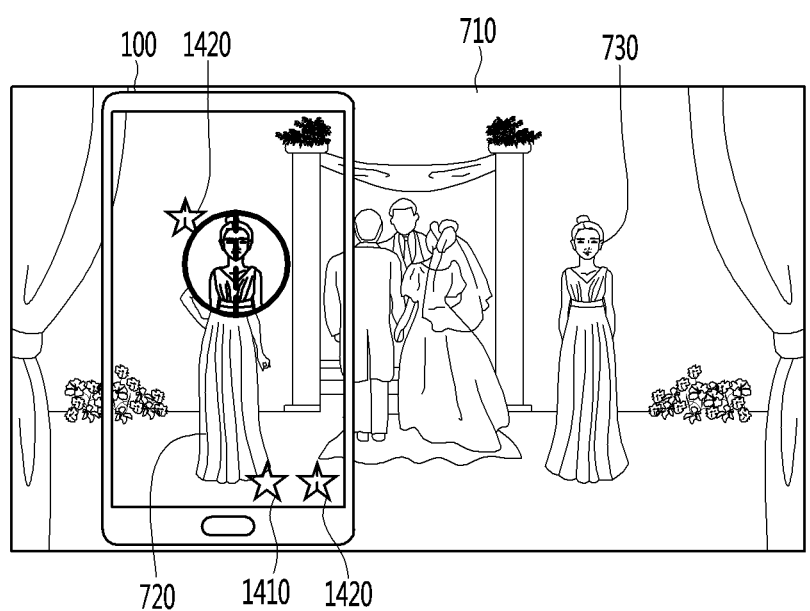

FIGS. 14A to 14C are diagrams illustrating an example in which a mobile terminal 100 according to an embodiment of the present disclosure provides a guide for a photographing state of a focused photographing object.

According to an embodiment of the present disclosure, the mobile terminal 100 may provide the guide for the photographing state of the focused photographing object.

The mobile terminal 100 may automatically recognize the focused photographing object. Specifically, the mobile terminal 100 may recognize a human or a thing as the focused photographing object.

The mobile terminal 100 may set the focused photographing object in response to setting of a user. A plurality of focused photographing objects may be set.

When a 360-degree video is captured by using a 360-degree camera, the plurality of focused photographing objects may be placed in a certain region of the 360-degree video. However, since a screen of the mobile terminal 100 may be restricted to a certain size, it is impossible to view a whole region of the 360-degree video at a glance. As a result, the user may not view a photographing state of the focused photographing object which is not displayed on the screen of the mobile terminal 100.

Therefore, the mobile terminal 100 according to an embodiment of the present disclosure may provide a guide for the photographing state of the focused photographing object which is not viewed on the screen thereof. To this end, the mobile terminal 100 may display an identifier with respect to the focused photographing object. When the focused photographing object is placed in a stitching region, in order to display that the focused photographing object is cut by the stitching region, a dotted-line may be displayed on the identifier with respect to the focused photographing object. When the focused photographing object is not placed in the stitching region, a dotted-line may not be displayed on the identifier with respect to the focused photographing object. When the identifier with respect to the focused photographing object is selected, the mobile terminal 100 may superimpose and display a screen of a region including the focused photographing object which is not currently displayed, on a screen currently displayed. In this case, when the focused photographing object is placed in the stitching region, in order to display that the focused photographing object is cut by the stitching region, a dotted-line may be displayed on the screen of the region including the focused photographing object. On the contrary, when the focused photographing object is not placed in the stitching region, a dotted-line may not be displayed on the screen of the region including the focused photographing object.

As a result, even when the user captures the 360-degree video while monitoring a screen or a region in which the focused photographing object is not displayed, the user may adjust a photographing direction based on the identifier with respect to the focused photographing object such that the focused photographing object not currently displayed on the screen deviates from the stitching region.

FIG. 14A illustrates a case where the identifier with respect to the focused photographing object is displayed. The mobile terminal 100 may display the identifier with respect to the focused photographing object at a screen bottom. The identifier may indicate the focused photographing object which is not currently displayed on the screen of the mobile terminal 100. The identifier may display whether a corresponding focused photographing object is stitched. Specifically, when the corresponding focused photographing object is stitched, a dotted-line corresponding to a stitching direction may be displayed on a corresponding identifier.

Referring to FIG. 14A, the mobile terminal 100 displays a region including a main character 720. In this case, a first identifier 1410 and a second identifier 1420 are displayed at the screen bottom, the first identifier 1410 and the second identifier 1420 respectively indicating focused photographing objects displayed in other regions of the 360-degree video, which are not currently displayed. Therefore, the user recognizes that two focused photographing objects are displayed in other regions not currently displayed. In addition, a dotted-line is vertically displayed on the second identifier 1420. As a result, the user may know that an object corresponding to the second identifier 1420 is stitched.

FIG. 14B is a diagram illustrating an example in which a focused photographing object corresponding to an identifier is displayed. When an identifier corresponding to the focused photographing object is selected, the mobile terminal 100 may superimpose and display a focused photographing object displayed on other region on a certain region on the screen.

FIG. 14B illustrates a case where the first identifier 1410 is selected on the screen shown in FIG. 14A. The first identifier 1410 may be an object which is not over a stitching region and is not currently viewed on the screen. In this case, the mobile terminal 100 displays a current state of a focused photographing object displayed in other region of the 360-degree video. Referring to FIG. 14B, the focused photographing object corresponding to the first identifier 1410 is displayed in a circular region on the screen.

FIG. 14C is a diagram illustrating another example in which a focused photographing object corresponding to an identifier is displayed. When an identifier corresponding to the focused photographing object is selected, the mobile terminal 100 may superimpose and display a focused photographing object displayed on other region on a certain region on the screen.

FIG. 14C illustrates a case where the second identifier 1420 is selected on the screen shown in FIG. 14A. The second identifier 1420 may be an object which is over the stitching region and is not currently viewed on the screen. In this case, the mobile terminal 100 displays a current state of a focused photographing object displayed in other region of the 360-degree video. Referring to FIG. 14C, a focused photographing object corresponding to the second identifier 1420 is displayed in a circular region on the screen. In this case, a stitching region is displayed on the focused photographing object. As a result, the user may easily know that a corresponding object is stitched.

According to the present embodiment described above, the user may grasp a photographing state by collecting focused photographing objects which are not to be stitched, and then, may capture the 360-degree video by adjusting a direction of the 360-degree camera in a state where the focused photographing objects deviate from the stitching region. Therefore, the user may adjust the photographing state of the 360-degree video while monitoring the direction and the whole state of the 360-degree video.

According to at least one of embodiments of the present disclosure, it is possible to provide a guide for avoiding a stitching region.

In addition, according to at least one of embodiments of the present disclosure, a mobile terminal may capture a 360-degree video having more excellent quality by displaying physical constraints of a front surface and a back surface in a camera.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display; and
   a controller configured to:
   acquire a plurality of videos captured by a 360-degree camera;
   generate a 360-degree video by combining or stitching the plurality of videos;
   cause the display to display a partial area of a whole region of the generated 360-degree video, wherein the whole region includes a plurality of focused photographing objects and at least one of the plurality of focused photographing objects is not included in the displayed partial area;
   cause the display to display a stitching region corresponding to a first focused photographing object on the displayed partial area, when the first focused photographing object included in the 360-degree video is displayed and placed in a boundary region in which at least two of the plurality of videos are connected;
   increase an area of the displayed stitching region as a distance between the 360-degree camera and the first focused photographing object decreases; and
   cause the display to display an identifier corresponding to a second focused photographing object when the second focused photographing object among the plurality of focused photographing objects is not displayed,
   wherein the identifier includes information indicating that the second focused photographing object is placed in the boundary region when the second focused photographing object, which is not displayed, is placed in the boundary region.

2. The mobile terminal of claim 1, wherein the controller is further configured to provide a guide for the first focused photographing object to avoid the stitching region in response to an input for selecting the stitching region.

3. The mobile terminal of claim 2, wherein the stitching region corresponding to the first focused photographing object is no longer displayed when the 360-degree camera is turned toward a different direction or angle.

4. The mobile terminal of claim 2, wherein the guide is provided in at least one of a text format or a voice format.

5. The mobile terminal of claim 1, wherein the controller is further configured to cause the display to display the stitching region as a bold dashed-line.

6. The mobile terminal of claim 1, wherein the first focused photographing object is a human or an object.

7. The mobile terminal of claim 1, wherein the first focused photographing object is set by a user.

8. The mobile terminal of claim 1, wherein:
   the 360-degree camera comprises a plurality of cameras such that each of the plurality of cameras captures a respectively corresponding one of the plurality of videos; and
   the controller is further configured to cause the display to display information of each of the plurality of cameras on the respectively corresponding one of the plurality of videos.

9. The mobile terminal of claim 8, wherein the controller is further configured to cause the display to display information of at least one of a resolution, a type, or a position of each of the plurality of cameras on the respectively corresponding one of the plurality of videos.

10. The mobile terminal of claim 8, wherein the controller is further configured to cause the display to display a central region of a view angle of each of the plurality of cameras on the respectively corresponding one of the plurality of videos.

11. The mobile terminal of claim 8, wherein:
    the plurality of cameras comprise a high resolution camera and a low resolution camera; and
    the controller is further configured to cause the display to display a first video captured by the high resolution camera and a second video captured by the low resolution camera such that the first video and the second video are distinguished from each other among the plurality of videos.

12. The mobile terminal of claim 11, wherein the controller is further configured to cause the display to display the first video in a first region indicated by a bold dashed-line.

13. The mobile terminal of claim 12, wherein the controller is further configured to cause the display to display the second video in a second region faintly relative to the first video in the first region.

14. The mobile terminal of claim 1, wherein:
    the second focused photographing object included in the whole region is not included in the displayed partial area; and
    the information is not included in the identifier when the second focused photographing object is not placed in the boundary region.

15. The mobile terminal of claim 14, wherein the controller is further configured to cause the display to display the second focused photographing object in response to selection of the identifier.

16. A method of operating a mobile terminal, the method comprising:
    acquiring a plurality of videos captured by a 360-degree camera;
    generating a 360-degree video by combining or stitching the plurality of videos;
    displaying a partial area of a whole region of the generated 360-degree video, wherein the whole region includes a plurality of focused photographing objects and at least one of the plurality of focused photographing objects is not included in the displayed partial area;
    displaying a stitching region corresponding to a first focused photographing object on the displayed partial area, when the first focused photographing object included in the 360-degree video is displayed and placed in a boundary region in which at least two of the plurality of videos are connected;
    increasing an area of the displayed stitching region as a distance between the 360-degree camera and the first focused photographing object decreases; and
    displaying an identifier corresponding to a second focused photographing object when the second focused photographing object among the plurality of focused photographing objects is not displayed,
    wherein the identifier includes information indicating that the second focused photographing object is placed in the boundary region when the second focused photographing object, which is not displayed, is placed in the boundary region.

17. The method of claim 16, further comprising providing a guide for the first focused photographing object to avoid the stitching region in response to an input for selecting the stitching region.

18. The method of claim 17, wherein the stitching region corresponding to the first focused photographing object is no longer displayed when the 360-degree camera is turned toward a different direction or angle.

19. The method of claim 16, wherein the first focused photographing object is a human or an object.

20. The method of claim 16, wherein:
- the 360-degree camera comprises a plurality of cameras such that each of the plurality of cameras captures a respectively corresponding one the plurality of videos; and
- information of each of the plurality of cameras is displayed on the respectively corresponding one of the plurality of videos.

* * * * *